United States Patent
Kim et al.

(10) Patent No.: US 10,425,609 B2
(45) Date of Patent: Sep. 24, 2019

(54) IMAGE DISPLAY APPARATUS AND METHOD OF DISPLAYING IMAGE

(71) Applicant: SAMSUNG ELECTRONICS CO., LTD., Suwon-si (KR)

(72) Inventors: Jae-man Kim, Suwon-si (KR); Joo-heon Lee, Suwon-si (KR); Shane Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/811,974

(22) Filed: Jul. 29, 2015

(65) Prior Publication Data
US 2016/0134828 A1 May 12, 2016

(30) Foreign Application Priority Data
Nov. 7, 2014 (KR) ........................ 10-2014-0154737

(51) Int. Cl.
*H04N 5/445* (2011.01)
*H04N 5/45* (2011.01)
(Continued)

(52) U.S. Cl.
CPC ..... *H04N 5/44591* (2013.01); *G06F 3/04886* (2013.01); *H04N 5/4403* (2013.01);
(Continued)

(58) Field of Classification Search
CPC ................................................ H04N 5/44591
(Continued)

(56) References Cited

U.S. PATENT DOCUMENTS

| 5,900,868 A | 5/1999 | Duhault et al. |
| 8,155,631 B2 | 4/2012 | Kim et al. |

(Continued)

FOREIGN PATENT DOCUMENTS

| CN | 101617529 A | 12/2009 |
| CN | 101911677 A | 12/2010 |

(Continued)

OTHER PUBLICATIONS

Communication dated Jan. 25, 2016, issued by the European Patent Office in counterpart European Application No. 15191770.5.
(Continued)

*Primary Examiner* — Jefferey F Harold
*Assistant Examiner* — Justin Sanders
(74) *Attorney, Agent, or Firm* — Sughrue Mion, PLLC

(57) ABSTRACT

A method of displaying an image and an image display apparatus are provided. The method includes a method of displaying an image, the method including displaying an image of a current channel among channels, receiving a first input to change the current channel to a next channel after the current channel, or a second input to change the current channel to a previous channel before the current channel, and dividing a display into areas in response to the receiving the first input or the second input. The method further includes displaying images of next channels after the current channel in the areas, in response to the receiving the first input, and displaying images of previous channels before the current channel in the areas, in response to the receiving the second input.

22 Claims, 21 Drawing Sheets

(51) Int. Cl.
   *H04N 21/422*   (2011.01)
   *H04N 21/431*   (2011.01)
   *H04N 21/438*   (2011.01)
   *H04N 21/482*   (2011.01)
   *H04N 21/485*   (2011.01)
   *G06F 3/0488*   (2013.01)
   *H04N 5/44*     (2011.01)

(52) U.S. Cl.
   CPC ......... *H04N 5/45* (2013.01); *H04N 21/42215* (2013.01); *H04N 21/4312* (2013.01); *H04N 21/4316* (2013.01); *H04N 21/4383* (2013.01); *H04N 21/482* (2013.01); *H04N 21/4858* (2013.01); *G06F 2203/04803* (2013.01)

(58) Field of Classification Search
   USPC ........................................................ 348/564
   See application file for complete search history.

(56) References Cited

U.S. PATENT DOCUMENTS

| | | | |
   |---|---|---|---|
   | 8,209,723 B2 | 6/2012 | Sakaguchi et al. | |
   | 2004/0019908 A1* | 1/2004 | Williams | H04N 7/0887 725/46 |
   | 2007/0011623 A1 | 1/2007 | Billmaier et al. | |
   | 2008/0235737 A1 | 9/2008 | Read | |
   | 2009/0199241 A1 | 8/2009 | Unger et al. | |
   | 2009/0313670 A1 | 12/2009 | Takao | |
   | 2010/0293573 A1 | 11/2010 | Kang et al. | |
   | 2011/0083148 A1* | 4/2011 | Sakaguchi | H04N 5/44543 725/39 |
   | 2012/0162514 A1 | 6/2012 | Ryu et al. | |
   | 2015/0341598 A1 | 11/2015 | Wu et al. | |

FOREIGN PATENT DOCUMENTS

| | | |
   |---|---|---|
   | EP | 1848212 A2 | 10/2007 |
   | JP | 2010-045860 A | 2/2010 |
   | KR | 100757231 B1 | 9/2007 |
   | WO | 03/021414 A1 | 3/2003 |
   | WO | 2014108054 A1 | 7/2014 |

OTHER PUBLICATIONS

International Search Report and Written Opinion dated Mar. 25, 2016, issued by the International Searching Authority in counterpart International Application No. PCT/KR2015/010960.
   Communication dated Feb. 1, 2018 by the State Intellectual Property Office of P.R. China in counterpart Chinese Patent Application No. 201510754055.6.
   Communication dated Sep. 26, 2018 issued by the State Intellectual Property Office of P.R. China in counterpart Chinese Application No. 201510754055.6.
   Communication dated Mar. 19, 2019 issued by the State Intellectual Property Office of P.R. China in counterpart Chinese Patent Application No. 201510754055.6.

* cited by examiner

FIG. 1
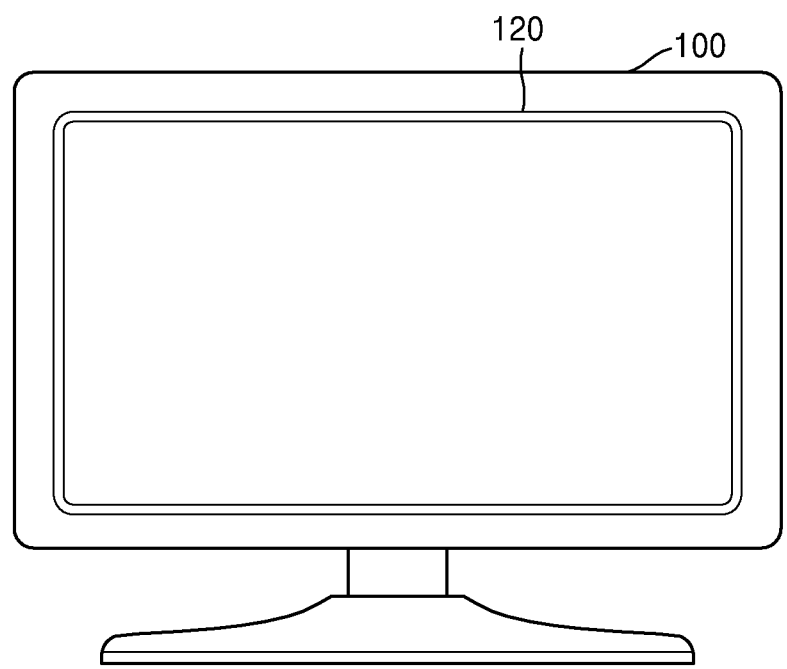
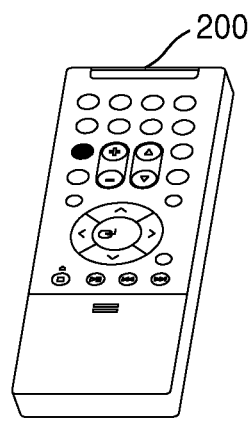

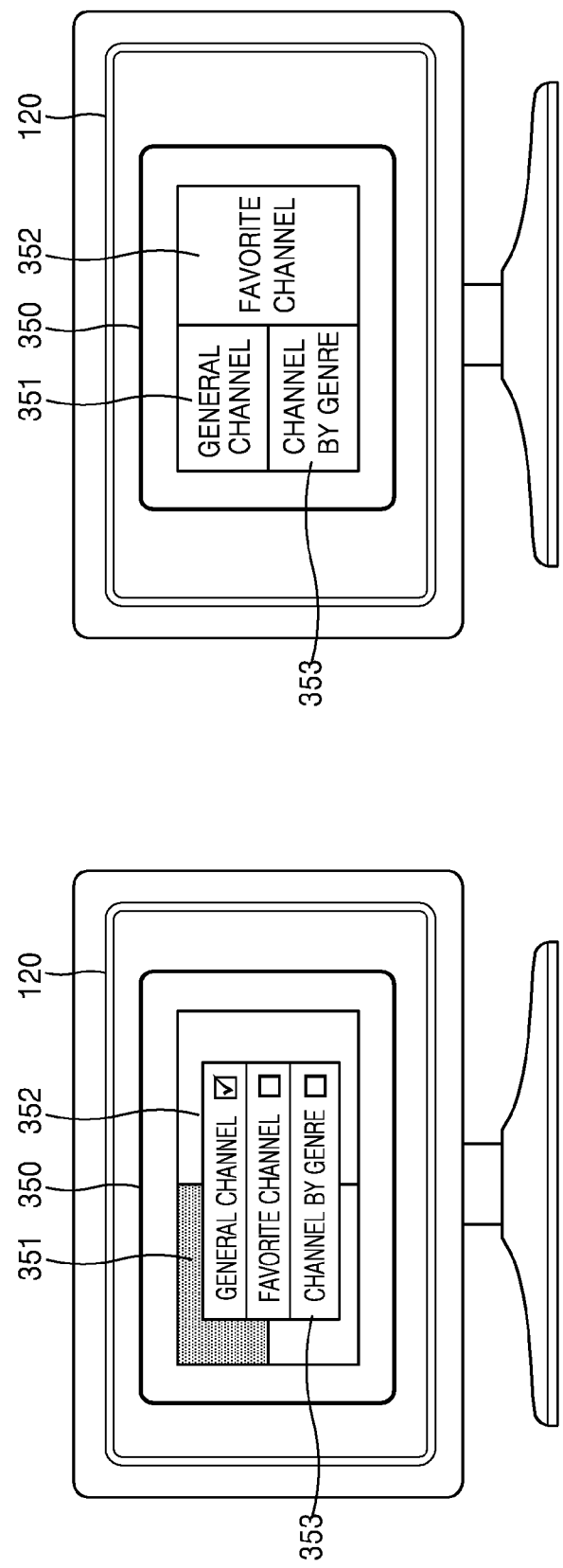

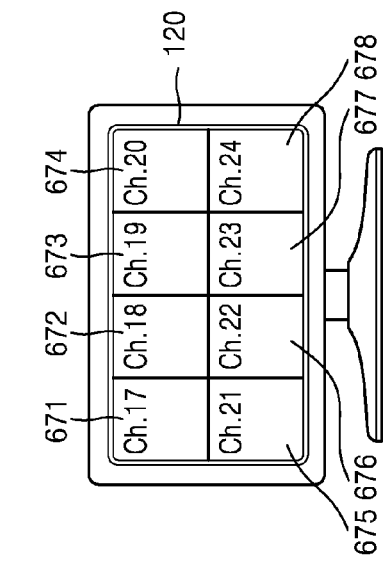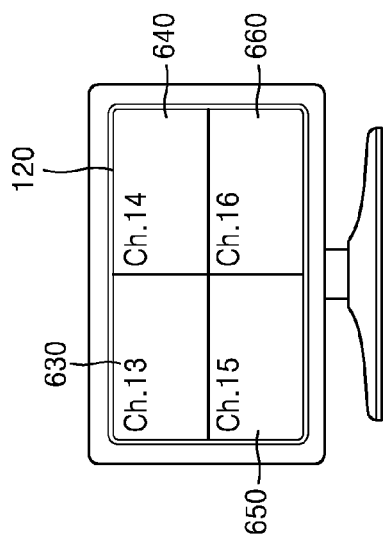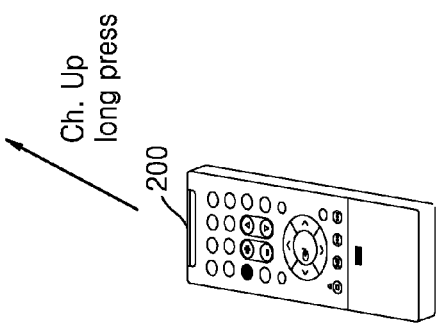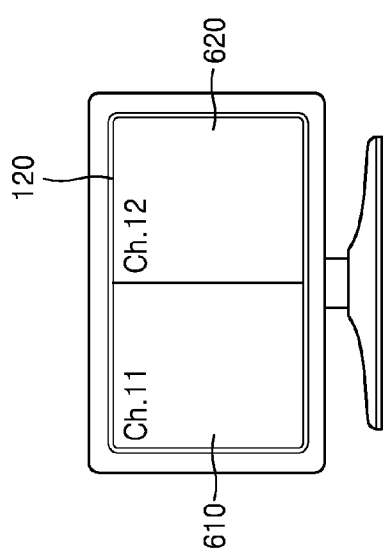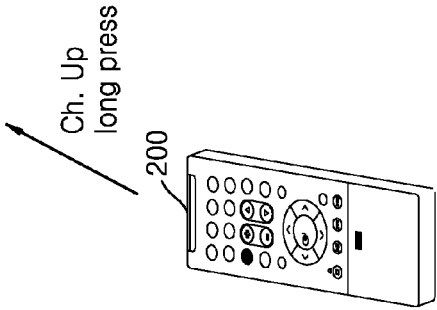

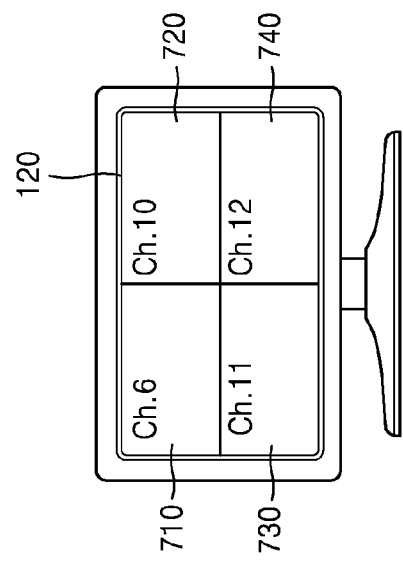
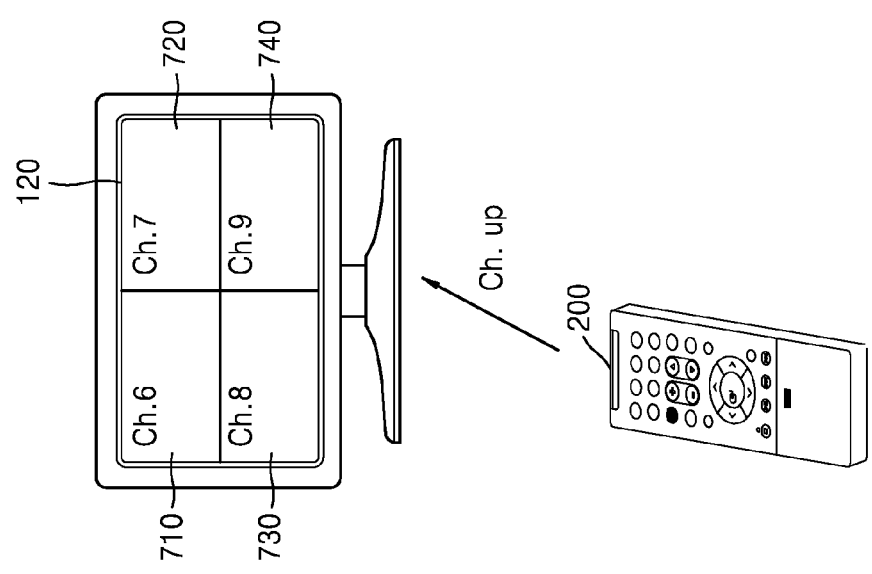
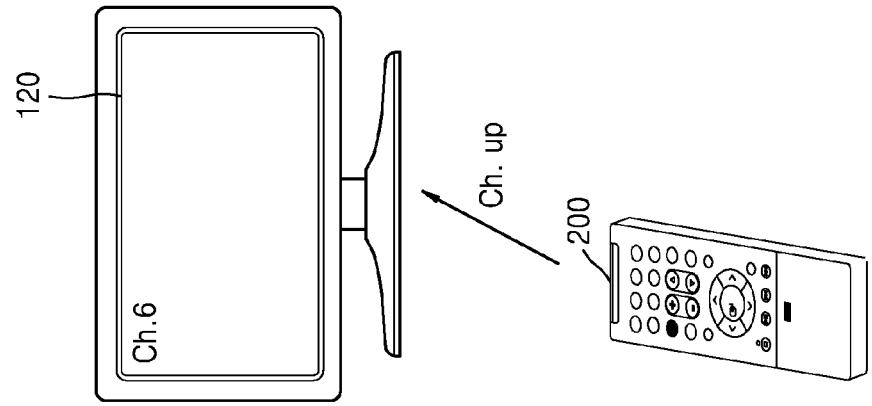

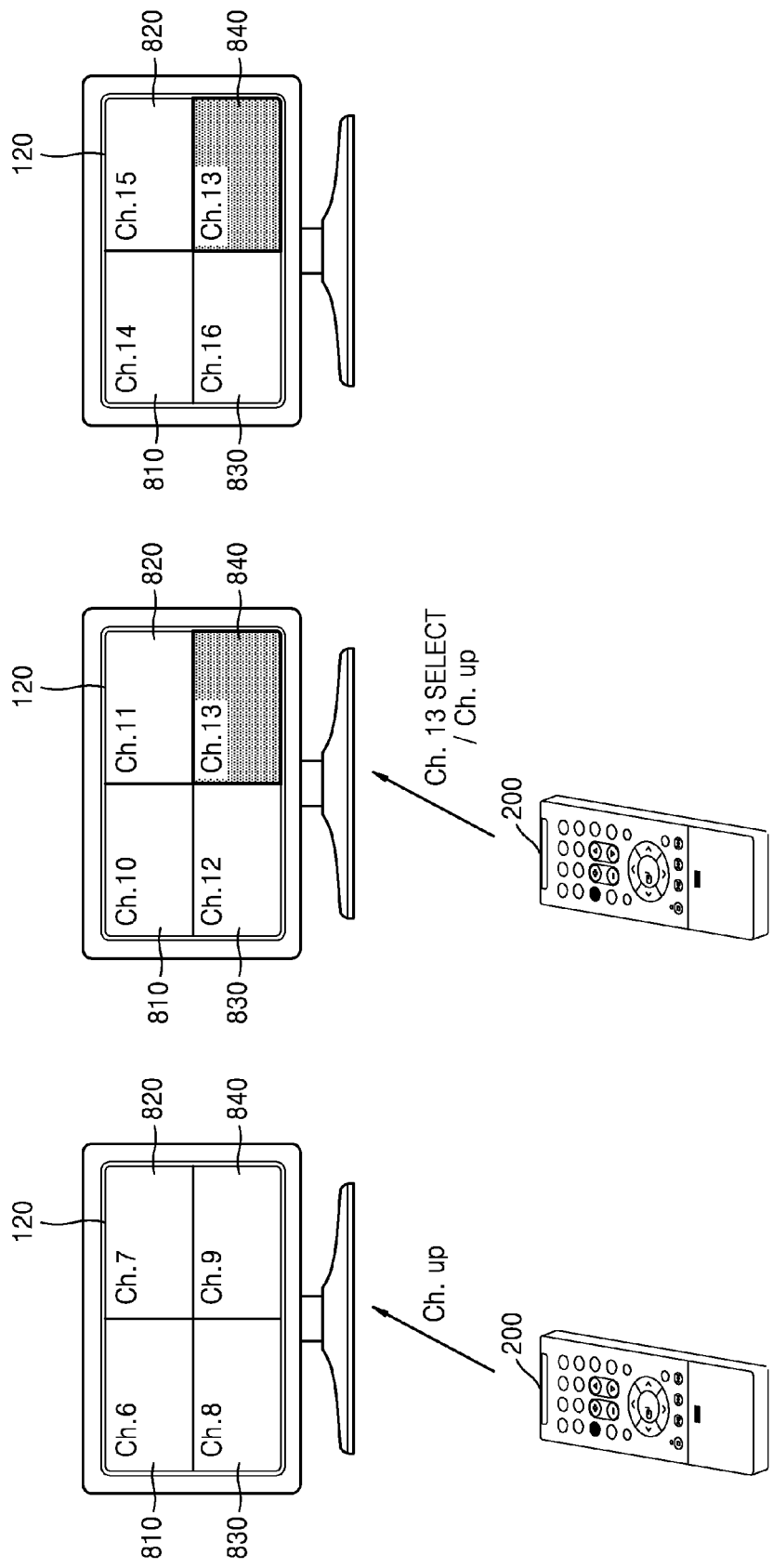

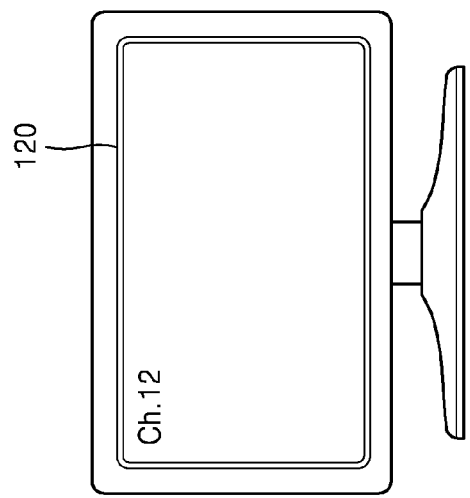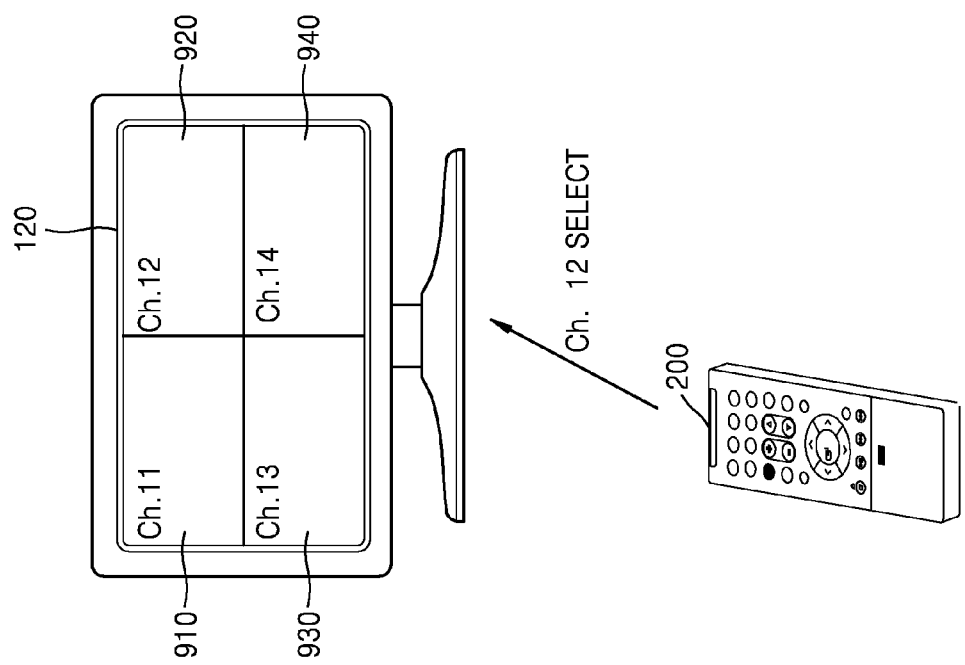

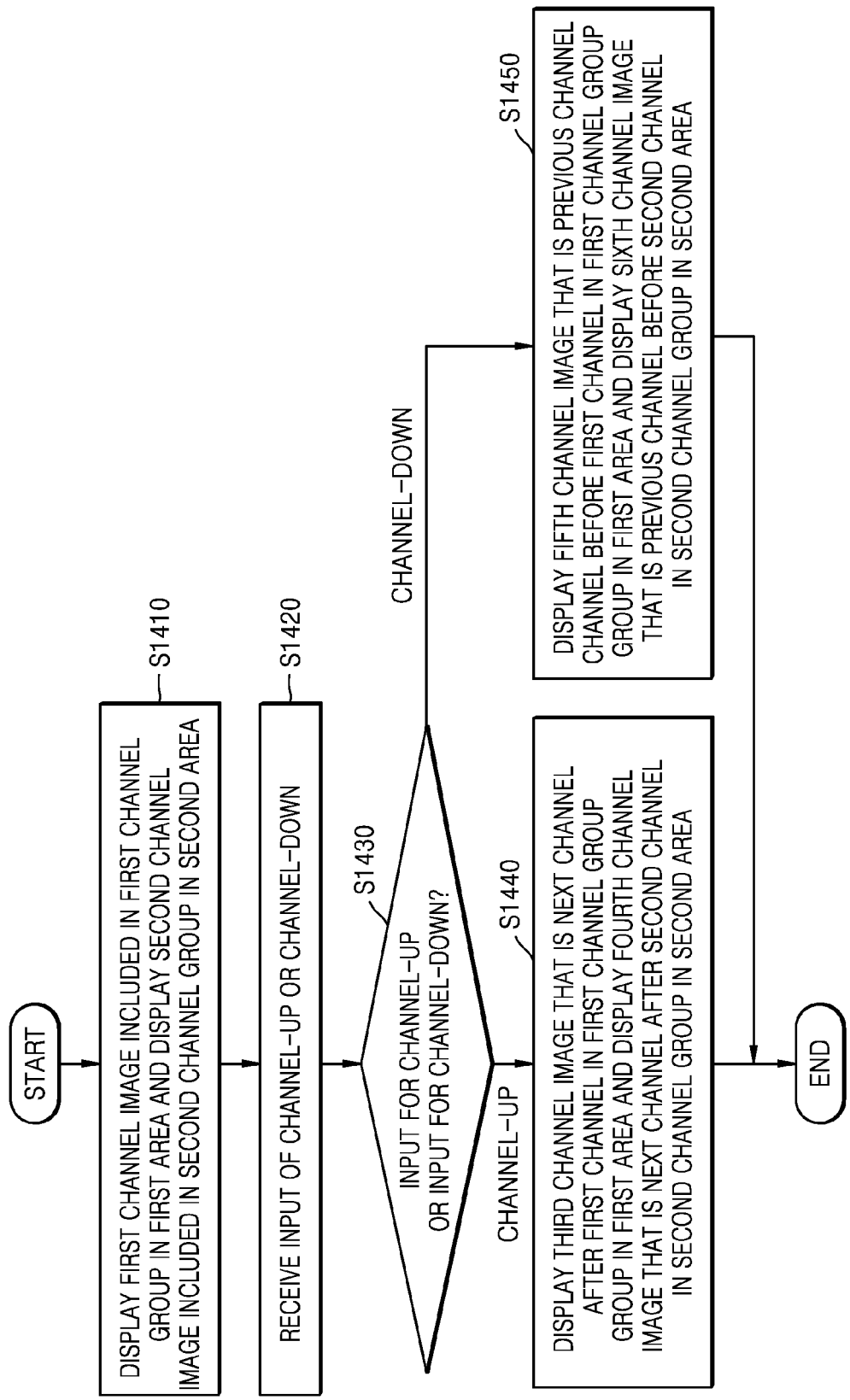

IMAGE DISPLAY APPARATUS AND METHOD OF DISPLAYING IMAGE

CROSS-REFERENCE TO RELATED APPLICATION

This application claims priority from Korean Patent Application No. 10-2014-0154737, filed on Nov. 7, 2014, in the Korean Intellectual Property Office, the disclosure of which is incorporated herein by reference in its entirety.

BACKGROUND

1. Field

Apparatuses and methods consistent with exemplary embodiments relate to an image display apparatus and a method of displaying an image.

2. Description of the Related Art

An image display apparatus is an apparatus having a function of displaying an image to be seen by a user. The user may watch a broadcast program through the image display apparatus. The image display apparatus displays on a display a broadcast program that the user chooses from among broadcast signals transmitted from a broadcasting station. It is a global trend to convert analog broadcasting to digital broadcasting.

Digital broadcasting signifies broadcasting digital images and sound signals. Digital broadcasting is resilient to external noise, thus having less data loss, is advantageous in terms of error correction, and provides a high resolution and clear image, compared to analog broadcasting. Also, digital broadcasting is capable of providing bidirectional services unlike analog broadcasting.

Also, smart TVs capable of supplying various contents in addition to the digital broadcasting function have become widely available. A smart TV aims to supply contents by analyzing user's demands without a user's intentional operation, instead of being passively operated by a user's selection.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide an image display apparatus that may simultaneously display images corresponding to next or previous channels before a current channel by entering a multidivisional screen mode when there is an input for channel-up or channel-down, and a method of displaying an image.

According to an aspect of an exemplary embodiment, there is provided a method of displaying an image including a method of displaying an image, the method including displaying an image of a current channel among channels, receiving a first input to change the current channel to a next channel after the current channel, or a second input to change the current channel to a previous channel before the current channel, and dividing a display into areas in response to the receiving the first input or the second input. The method further includes displaying images of next channels after the current channel in the areas, in response to the receiving the first input, and displaying images of previous channels before the current channel in the areas, in response to the receiving the second input.

The displaying the images of the next channels may include, in response to the receiving the first input displaying an image of a first next channel after the current channel in a first area among the areas, and displaying an image of a second next channel after the first next channel in a second area among the areas.

The displaying the images of the previous channels may include, in response to the receiving the second input displaying an image of a first previous channel before the current channel in a first area among the areas, and displaying an image of a second previous channel before the first previous channel in a second area among the areas.

The method may further include displaying the image of the current channel in a first area among the areas, the displaying the images of the next channels may include displaying the images of the next channels after the current channel in remaining areas other than the first area among the areas, in response to the receiving the first input, and the displaying the images of the previous channels may include displaying the images of the previous channels before the current channel in the remaining areas, in response to the receiving the second input.

The method may further include receiving a third input to select an image among the displayed images, displaying the selected image in a first area among the areas, and displaying images of next channels after a channel of the selected image in remaining areas other than the first area among the areas, in response to the receiving the third input and the first input, and displaying the selected image in the first area, and displaying images of previous channels before a channel of the selected image in the remaining areas, in response to the receiving the third input and the second input.

The first input may be a press of a first key for more than a duration of time, and the second input is a press of a second key for more than the duration of time.

The method may further include receiving a third input to select an image among the displayed images, and incorporating the areas into one area, and displaying the selected image in the one area, in response to the receiving the third input.

The displaying the images of the next channels may include, in response to the receiving the first input, displaying an image of a first next channel after the current channel among channels included in a first channel group, in a first area among the areas, and displaying an image of a second next channel after the current channel among channels included in a second channel group, in a second area among the areas. The displaying the images of the previous channels may include, in response to the receiving the second input, displaying an image of a first previous channel before the current channel among the channels included in the first channel group, in the first area, and displaying an image of a second previous channel before the current channel among the channels included in the second channel group, in the second area.

Each of the first channel group and the second channel group may include at least one among a group including general channels, a group including favorite channels, and a group including channels that are classified by genre.

At least one among the channels of the first channel group and the channels of the second channel group may be in a same genre as a genre of the current channel.

At least one among the first channel group and the second channel group may be set by a user input.

An order of the channels may be determined based on a channel number indicating each of the channels.

A next channel after a last channel among the channels may be a first channel among the channels.

According to an aspect of another exemplary embodiment, there is provided a method of displaying an image, the method including dividing a display into areas including a first area and a second area, displaying, in the first area, an image of a first channel among channels included in a first channel group, and displaying, in the second area, an image of a second channel among channels included in a second channel group. The method further includes receiving a first input to change the first channel and the second channel to next channels after the first channel and the second channel, respectively, or a second input to change the first channel and the second channel to previous channels before the first channel and the second channel, respectively, in response to the receiving the first input, displaying, in the first area, an image of a first next channel after the first channel among the channels included in the first channel group, and displaying, in the second area, an image of a second next channel after the second channel among the channels included in the second channel group, and in response to the receiving the second input, displaying, in the first area, an image of a first previous channel before the first channel among the channels included in the first channel group, and displaying, in the second area, an image of a second previous channel before the second channel among the channels included in the second channel group.

An order of the channels included in the first channel group may be determined based on a channel number indicating each of the channels included in the first channel group.

A next channel after a last channel among the channels included in the first channel group may be a first channel among the channels included in the first channel group.

According to an aspect of another exemplary embodiment, there is provided an image display apparatus including a display configured to display an image of a current channel among channels, and an interface configured to receive a first input to change the current channel to a next channel after the current channel, or a second input to change the current channel to a previous channel before the current channel. The apparatus further includes a controller configured to divide a display into areas in response to the interface receiving the first input or the second input, control the display to display images of next channels after the current channel in the areas, in response to the interface receiving the first input, and control the display to display images of previous channels before the current channel in the areas, in response to the interface receiving the second input.

The controller may be further configured to control the display to, in response to the interface receiving the first input display an image of a first next channel after the current channel in a first area among the areas, and display an image of a second next channel after the first next channel in a second area among the areas.

The controller may be further configured to control the display to, in response to the interface receiving the second input display an image of a first previous channel before the current channel in a first area among the areas, and display an image of a second previous channel before the first previous channel in a second area among the areas.

The controller may be further configured to control the display to display the image of the current channel in a first area among the areas, display the images of the next channels after the current channel in remaining areas other than the first area among the areas, in response to the interface receiving the first input, and display the images of the previous channels before the current channel in the remaining areas, in response to the interface receiving the second input.

The interface may be further configured to receive a third input to select an image among the displayed images, and the controller may be further configured to control the display to display the selected image in a first area among the areas, and display images of next channels after a channel of the selected image in remaining areas other than the first area among the areas, in response to the interface receiving the third input and the first input, and display the selected image in the first area, and display images of previous channels before a channel of the selected image in the remaining areas, in response to the interface receiving the third input and the second input.

The interface may be further configured to receive a third input to select an image among the displayed images, and the controller may be further configured to incorporate the areas into one area, and control the display to display the selected image in the one area, in response to the interface receiving the third input.

The controller may be further configured to control the display to in response to the receiving the first input, display an image of a first next channel after the current channel among channels included in a first channel group, in a first area among the areas, and display an image of a second next channel after the current channel among channels included in a second channel group, in a second area among the areas, and in response to the receiving the second input, display an image of a first previous channel before the current channel among the channels included in the first channel group, in the first area, and display an image of a second previous channel before the current channel among the channels included in the second channel group, in the second area.

According to an aspect of another exemplary embodiment, there is provided an image display apparatus including a display, a controller configured to divide a display into areas including a first area and a second area, control the display to display, in the first area, an image of a first channel among channels included in a first channel group, and control the display to display, in the second area, an image of a second channel among channels included in a second channel group. The apparatus further includes an interface configured to receive a first input to change the first channel and the second channel to next channels after the first channel and the second channel, respectively, or a second input to change the first channel and the second channel to previous channels before the first channel and the second channel, respectively. The controller is further configured to in response to the interface receiving the first input, displaying, in the first area, an image of a first next channel after the first channel among the channels included in the first channel group, and displaying, in the second area, an image of a second next channel after the second channel among the channels included in the second channel group, and in response to the interface receiving the second input, displaying, in the first area, an image of a first previous channel before the first channel among the channels included in the first channel group, and displaying, in the second area, an image of a second previous channel before the second channel among the channels included in the second channel group.

According to an aspect of another exemplary embodiment, there is provided a method of displaying an image, the method including displaying a current image of a current channel, receiving a channel change input to change the current channel, and dividing a display into areas, and displaying a first image of a first new channel in a first area among the areas, in response to the receiving the channel change input.

The method may further include displaying a second image of a second new channel in a second area among the areas, in response to the receiving the channel change input.

The channel change input may be to change the current channel to a next channel that has a channel number greater than a channel number of the current channel, the first new channel may have a channel number greater than the channel number of the current channel, and the second new channel may have a channel number greater than the channel number of the first new channel.

The channel change input may be to change the current channel to a previous channel that has a channel number less than a channel number of the current channel, the first new channel may have a channel number less than the channel number of the current channel, and the second new channel may have a channel number less than the channel number of the first new channel.

The method may further include receiving a channel select input to select the first new channel, receiving another channel change input to change the second new channel in response to the receiving the channel select input, and displaying the first image in the first area, and displaying a third image of a third new channel in the second area, in response to the receiving the other channel change input.

The method may further include displaying the current image of the current channel in a second area among the areas, in response to the receiving the channel change input.

BRIEF DESCRIPTION OF THE DRAWINGS

The above and/or other aspects will be more apparent by describing exemplary embodiments with reference to the accompanying drawings in which:

FIG. 1 is a view of an image display apparatus and a control apparatus, according to an exemplary embodiment;

FIGS. 5, 6, 7A, and 7B are views of menus for setting an image display apparatus to operate in a multidivisional screen mode when a channel-up input or a channel-down input is received, according to an exemplary embodiment;

FIGS. 13A to 13C are diagrams illustrating a method of displaying an image according to an exemplary embodiment;

FIGS. 14A to 14C are diagrams illustrating a method of displaying an image according to an exemplary embodiment;

FIGS. 15A to 15C are diagrams illustrating a method of displaying an image according to an exemplary embodiment;

FIGS. 16A and 16B are diagrams illustrating a method of displaying an image according to an exemplary embodiment;

FIG. 21 is a flowchart of a method of displaying an image according to an exemplary embodiment.

DETAILED DESCRIPTION OF THE EXEMPLARY EMBODIMENTS

Figure 2:
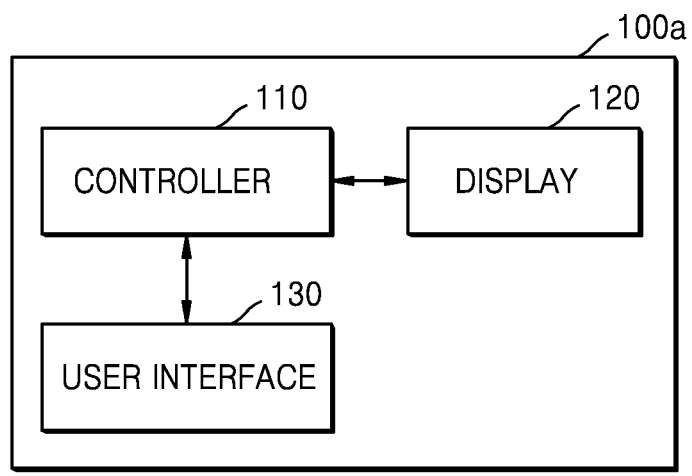
FIG. 2 is a block diagram of an image display apparatus according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

It will be understood that the terms such as "unit," "-er (-or)," and "module" described in the specification refer to an element for performing at least one function or operation, and may be implemented in hardware, software, or the combination of hardware and software.

FIG. 1 is a view of an image display apparatus 100 and a control apparatus 200, according to an exemplary embodiment. As illustrated in FIG. 1, the image display apparatus 100 is a TV, but may be embodied by any electronic apparatus including a display 120. For example, the image display apparatus 100 may be embodied by a variety of electronic apparatuses such as mobile phones, table personal computers (PCs), digital cameras, camcorders, laptop computers, desktop PCs, e-book terminals, terminals for digital broadcasting, personal digital assistants (PDAs), portable multimedia player (PMPs), navigation systems, MP3 players, wearable devices, etc. The image display apparatus 100 may be embodied in a display apparatus in which the display 120 is large as in TV sets, but the present exemplary embodiment is not limited thereto. Also, the image display apparatus 100 may be a fixed type or a movable type, and a digital broadcast receiver capable of receiving digital broadcasting.

The control apparatus 200 may be embodied by a variety of devices that control the image display apparatus 100 like a remote controller and a mobile phone. When the control apparatus 200 is embodied by a remote controller, the remote controller may include a touch pad. In this case, the image display apparatus 100 may be controlled by a touch input that is input through the touch pad.

Also, the control apparatus 200 may include a two-direction key. The two-direction key may be formed of an up key and a down key. For example, a first direction may indicate an upward direction, and a first direction key may be formed by an up key. Also, a second direction may indicate a downward direction, and a second direction key may be formed of a down key. However, the present exemplary embodiment is not limited thereto, and the first direction may indicate a leftward direction and the second direction may indicate a rightward direction.

The user may control an operation of the image display apparatus 100 by a user input of pressing any one key of the two directional keys included in the control apparatus 200. For example, a displayed change image may be changed by inputting any one key of the two-direction key. When the user presses the first direction key of the two-direction key, a next channel image of a channel image that is currently displayed on the display 120 may be displayed. In contrast, when the user presses the second direction key of the two-direction key, a previous channel image of the channel image displayed on the display 120 may be displayed.

Alternatively, in relation to the present exemplary embodiment, when the user presses the first direction key, the display 120 may be divided into a plurality of areas. A plurality of images corresponding to next channels after the currently displayed channel image may be displayed in the divided areas. Alternatively, the display 120 may be divided into a plurality of areas when the user presses the second direction key. In this case, a plurality of images corresponding to previous channels before the currently displayed channel image may be displayed in the divided areas.

The control apparatus 200 may be a pointing device. In other words, a pointer on the display 120 of the image display apparatus 100 may be moved, or displayed various menus may be selectively activated, according to a displacement value of an object such as a user's finger moving on the touch pad included in the control apparatus 200. Alternatively, the image display apparatus 100 may be controlled according to a user command to tilt the control apparatus 200 in a direction.

FIG. 2 is a block diagram of an image display apparatus 100a according to an exemplary embodiment. The image display apparatus 100a of FIG. 2 may be an exemplary embodiment of the image display apparatus 100 of FIG. 1.

Referring to FIG. 2, the image display apparatus 100a includes a controller 110, a display 120, and a user interface 130.

The controller 110 processes an image signal, and inputs the processed image signal to the display 120. Accordingly, an image corresponding to the image signal is displayed on the display 120. Also, the controller 110 may control the image display apparatus 100a according to a user command input through the user interface 130 or according to an internal program.

For example, according to an exemplary embodiment, during channel-up or channel-down based on the user input, the controller 110 may set a layout of a multidivisional screen displayed on the display 120. The controller 110 may determine an order of a plurality of channels based on channel numbers respectively indicating the channels.

Also, the controller 110 may map a channel group to each of divided areas. Also, when an input for channel-up or channel-down is received from the user interface 130, the controller 110 may divide the display 120 into a plurality of areas.

Also, the controller 110, in response to the input for channel-up, may control the display 120 to display, in the divided areas, images corresponding to next channels after a current channel corresponding to an image currently displayed on the display 120. Also, the controller 110, in response to the input for channel-down, may control the display 120 to display, in the divided areas, images corresponding to previous channels before the current channel.

The controller 110 may control the display 120 to display an image corresponding to the current channel in a first area of the areas, and images corresponding to the next channels or previous channels before the current channel in the other areas. Also, the controller 110 may change channels of the images other than a selected image of the images displayed in the areas.

When receiving an input of selecting any one of the images displayed in the areas, the controller 110 may control the display 120 to display the selected image in the entire area of the display 120.

The controller 110, in response to the input for channel-up, may control the display 120 to display, in the first area of the areas, an image corresponding to a channel set to a next channel after the current channel in a first channel group. Also, the controller 110 may control the display 120 to display, in a second area of the areas, an image corresponding to a channel set to a next channel after the current channel in a second channel group.

The controller 110, in response to the input for channel-down, may control the display 120 to display, in the first area of the areas, an image corresponding to a channel set to a previous channel before the current channel in the first channel group. Also, the controller 110 may control the display 120 to display, in the second area of the areas, an image corresponding to a channel set to a previous channel before the current channel in the second channel group.

The controller 110 may control the display 120 to divide the display 120 into the areas including the first area and the second area, display in the first area an image corresponding to a first channel of the channels included in the first channel group, and display in the second area an image corresponding to a second channel of the channels included in the second channel group. The controller 110, in response to the input for channel-up, may control the display 120 to display, in the first area, an image corresponding to a channel set to a next channel after the first channel of the channels included in the first channel group, and display, in the second area, an image corresponding to a channel set to a next channel after the second channel of the channels included in the second channel group. Also, the controller 110, in response to the input for channel-down, may control the display 120 to display, in the first area, an image corresponding to a channel set to a previous channel before the first channel of the channels included in the first channel group, and display, in the second area, an image corresponding to a channel set to a previous channel before the second channel of the channels included in the second channel group.

The display 120 generates a driving signal by converting an image signal, a data signal, an on-screen display (OSD) signal, or a control signal, which are processed by the controller 110. The display 120 may be embodied by a plasma display panel (PDP), a liquid crystal display (LCD), an organic light-emitting display (OLED), a flexible display, etc., or by a three-dimensional (3D) display. Also, the display 120 may be formed of a touch screen that is used as an input device in additional to an output device.

The user interface 130 transmits a signal input by the user to the controller 110 or a signal from the controller 110 to the user. Also, the user interface 130 may receive a user input signal such as a power on/off signal, a channel selection signal, a channel-up/-down signal, a screen setting, etc., from the control apparatus 200.

In exemplary embodiments, the user interface 130 may receive the input for channel-up or channel-down.

Figure 3:
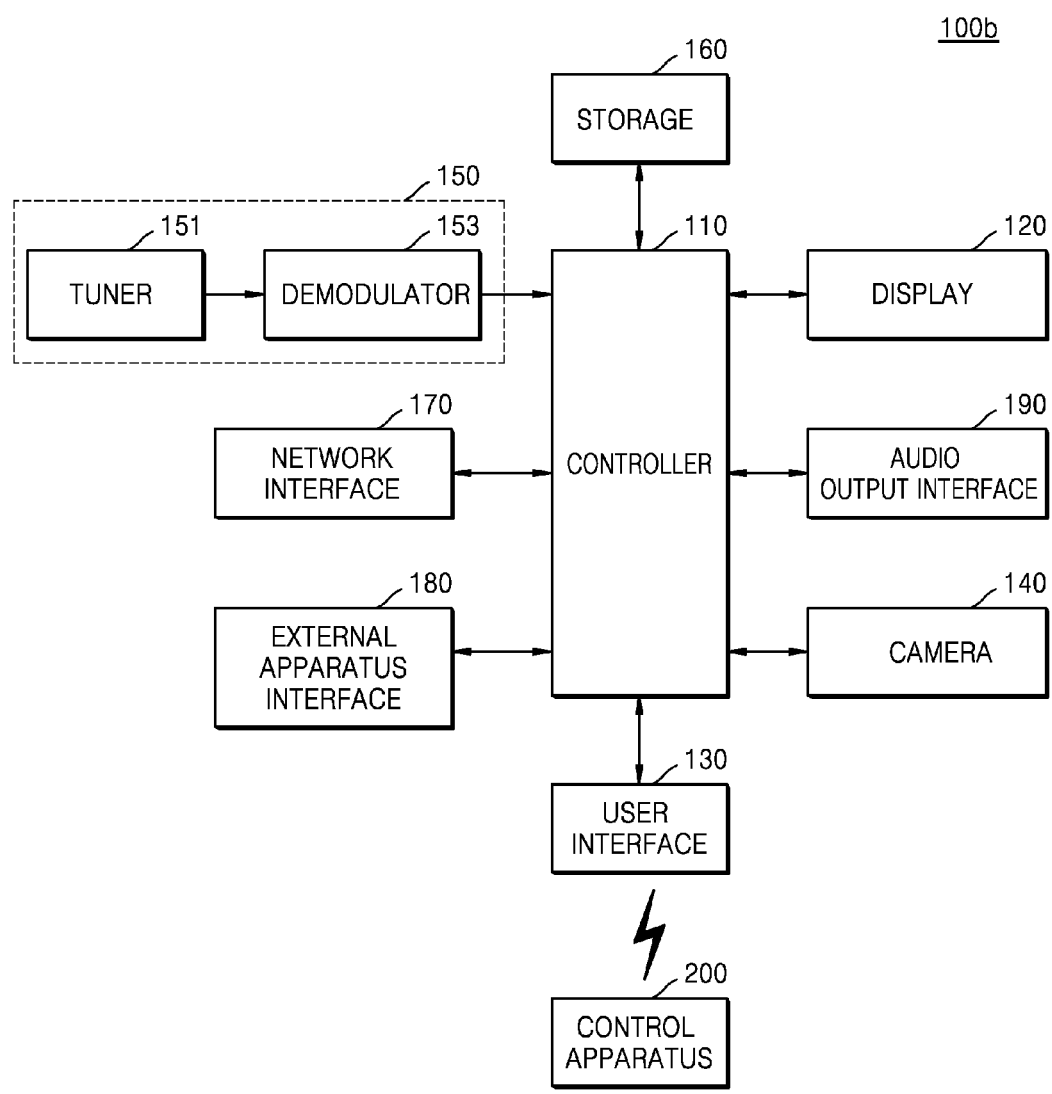
FIG. 3 is a block diagram of an image display apparatus according to an exemplary embodiment.

FIG. 3 is a block diagram of an image display apparatus 100b according to an exemplary embodiment. The image display apparatus 100b of FIG. 3 may be an exemplary embodiment of the image display apparatus 100 of FIG. 1.

Referring to FIG. 3, the image display apparatus 100b includes a broadcast receiver 150, an external apparatus interface 180, a storage 160, a sensor, an audio output interface 190, and a camera 140, in addition to the controller 110, the display 120, and the user interface 130.

Because the controller 110, the display 120, and the user interface 130 are described above with reference to FIG. 2, redundant descriptions thereof are omitted.

The broadcast receiver 150 includes a tuner 151 and a demodulator 153, and may include a network interface 170. The broadcast receiver 150 may include the tuner 151 and the demodulator 153 without including the network interface 170, as shown in FIG. 3, or inversely, may include the network interface 170 without including the tuner 151 and the demodulator 153.

The tuner 151 selects a radio frequency (RF) broadcast signal corresponding to a channel selected by the user or all previously stored channels, from RF broadcast signals received through an antenna. Also, a selected RF broadcast signal may be converted to an intermediate frequency (IF) signal or a baseband image or sound signal.

For example, when the selected RF broadcast signal is a digital broadcast signal, the selected RF broadcast signal is converted to a digital IF (DIF) signal, and when the selected RF broadcast signal is an analog broadcast signal, the selected RF broadcast signal is converted to an analog baseband image or sound signal (CVBS/SIF). In other words, the tuner 151 may process the digital broadcast signal or the analog broadcast signal. The analog baseband image or sound signal (CVBS/SIF) output from the tuner 151 may be directly input to the controller 110.

Also, the tuner 151 may receive a single carrier RF broadcast signal according to the Advanced Television System Committee (ATSC) method or a multi-cattier RF broadcast signal according to the Digital Video Broadcasting (DVB) method.

Alternatively, the tuner 151 may sequentially select RF broadcast signals of all channels stored by using a channel memory function among the RF broadcast signals received through the antenna according to the present exemplary embodiment, and convert the selected RF broadcast signals to IF signals or baseband image or sound signals.

Alternatively, the tuner 151 may include a plurality of tuners to receive broadcast signals of multiple channels. Alternatively, the tuner 151 may be a single tuner that simultaneously receives broadcast signals of multiple channels.

The demodulator 153 performs a demodulation operation by receiving the DIF signal converted by the tuner 151.

The demodulator 153 may output a stream signal TS after performing demodulation and channel decoding. The stream signal TS may be a signal multiplexing an image signal, a sound signal, or a data signal.

The stream signal TS output from demodulator 153 may be input to the controller 110. After performing de-multiplexing, image/sound signal processing, etc., the controller 110 outputs an image to the display 120, and outputs sound to the audio output interface 190.

The external apparatus interface 180 may transmit or receive data to/from an external apparatus. To this end, the external apparatus interface 180 may include an audio/video (A/V) input/output interface or a wireless communication interface.

The external apparatus interface 180 may be connected to the external apparatus such as a digital versatile disk (DVD) player, a Blu-ray player, a game console, a camera, a camcorder, a computer or laptop computer, a set-top box, etc., in a wired/wireless manner, and perform an input/output operation with respect to the external apparatus.

The A/V input/output interface may receive an input of an image and sound signal of the external apparatus. Alternatively, the wireless communication interface may perform short-range wireless communication with other electronic apparatuses.

The network interface 170 provides an interface for connecting the image display apparatus 100b to a wired/wireless network including the Internet. For example, the network interface 170 may receive contents or data provided by an Internet or contents provider or a network operator, through a network.

The storage 160 may store a program for processing and controlling signals in the controller 110 or store a signal processed image, sound, or a data signal.

Also, the storage 160 may perform a function for temporary storing of image, sound, or data signals input to the external apparatus interface 180. Also, the storage 160 may store information about a predetermined broadcast channel through a channel memory function of a channel map, etc.

Although FIG. 3 illustrates an exemplary embodiment in which the storage 160 is provided separated from the controller 110, exemplary embodiments are not limited thereto. The storage 160 may be included in the controller 110.

The user interface 130 transfers the signal input by the user to the controller 110 or the signal from the controller 110 to the user.

For example, the user interface 130 may transmit/receive the user input signal for power on/off, channel selection, screen setting, etc. to/from a control apparatus 200 that is described later with reference to FIG. 4, or may transfer the user input signal input from a local key such as a power key, a channel key, a volume key, a setting key, etc., to the controller 110. Alternatively, the user interface 130 may transfer to the controller 110 the user input signal input from the sensor for sensing a user gesture, or transmit the signal from the controller 110 to the sensor.

The controller 110 may generate or output a signal for outputting an image or sound, by inversely multiplexing streams input through the tuner 151, the demodulator 153, or the external apparatus interface 180 or processing the inversely multiplexed signals.

The image signal that is image-processed by the controller 110 is input to the display 120, and may be displayed as an image corresponding to the relevant image signal. Also, the image signal that is image-processed by the controller 110 may be input to an external output apparatus through the external apparatus interface 180.

The sound signal processed by the controller 110 may be sound-output to the audio output interface 190. Also, the sound signal processed by the controller 110 may be input to the external output apparatus through the external apparatus interface 180.

The controller 110 may include a demultiplexer or an image processor.

In addition, the controller 110 may control an overall operation of the image display apparatus 100b. For example, the controller 110 may control the tuner 151 to be tuned to RF broadcasting corresponding to a channel selected by the user or to a previously stored channel.

The audio output interface 190 may receive an input of the signal that is sound-processed by the controller 110 and output the received signal as sound.

The camera 140 may capture an image of the user by using the camera, and recognize the user based on the captured image. The camera 140 may be embodied by a single camera. However, the present exemplary embodiment is not limited thereto and the camera 140 may be embodied by a plurality of cameras. Alternatively, the camera may be embedded in the image display apparatus 100b to be arranged above the display 120 or to be separately arranged. Image information about the image captured by the camera may be input to the controller 110.

The controller 110 may detect the user gesture based on the image captured by the camera, each of the signals detected by the sensor, or a combination of the signals.

The control apparatus 200 transmits the user input to the user interface 130. To this end, the control apparatus 200 may use Bluetooth, RF communication, infrared (IR) communication, ultra wideband (UWB), a ZigBee method, etc. Also, the control apparatus 200 may receive the image, sound, or data signal output from the user interface 130, and display the received signal on the control apparatus 200 or output the received signal as sound.

The image display apparatus 100b is an example of an image signal processing apparatus that performs signal processing of an image stored in the apparatus or an image that is input. Another example of the image signal processing apparatus may include a set-top box excluding the display 120 and the audio output interface 190 of FIG. 3, the above-described DVD player, the Blu-ray player, the game console, the computer, etc.

Alternatively, the elements of the block diagrams of the image display apparatuses 100a and 110b illustrated in FIGS. 2 and 3 may be incorporated, added, or omitted according to exemplary embodiments of the image display apparatus 100. In other words, two or more elements may be incorporated into one element, or one element may be divided into two or more elements. Also, the function performed in each block is for description of the exemplary embodiment, and a detailed operation or apparatus does not limit exemplary embodiments.

Figure 4:
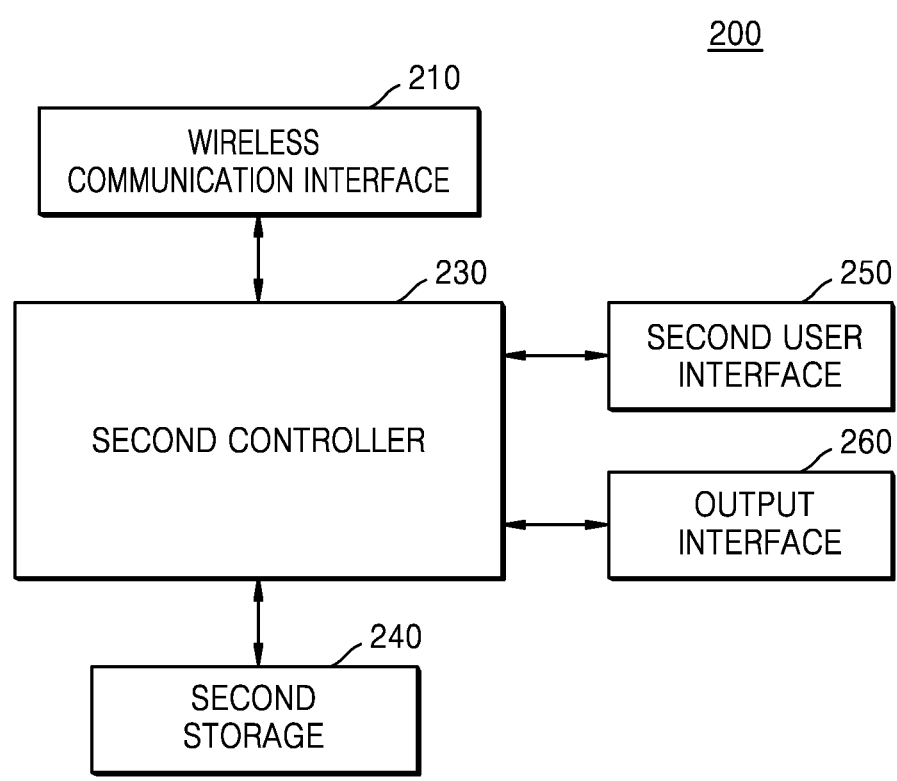
FIG. 4 is a block diagram of a control apparatus according to an exemplary embodiment.

FIG. 4 is a block diagram of the control apparatus 200 according to an exemplary embodiment.

Referring to FIG. 4, the control apparatus 200 includes a wireless communication interface 210, a second user interface 250, an output interface 260, a second storage 240, and a second controller 230.

The wireless communication interface 210 may transmit/receive signals to/from any one of the above-described image display apparatuses. The wireless communication interface 210 may include an IR module for transmitting/receiving signals to/from the image display apparatus 100 according to the IR communication protocol. Accordingly, the control apparatus 200 may transmit a command about power on/off, channel change, a volume change, etc. to the image display apparatuses 100a and 100b through the IR module.

The second user interface 250 may include a key pad, a button, a touch pad, or a touch screen. The user may input a command related to the image display apparatus 100 to the control apparatus 200 by manipulating the second user interface 250. When the second user interface 250 includes a hard key button, the user may input a command related to the image display apparatuses 100a and 100b to the control apparatus 200 through a push operation of the hard key button. When the second user interface 250 includes a touch screen, the user may input a command related to the image display apparatus 100 to the control apparatus 200 by touching a soft key of the touch screen. Also, the second user interface 250 may include various types of input devices such as a scroll key or a jog key that may be manipulated by the user.

In the present exemplary embodiment, the second user interface 250 includes a two-direction key. The two-direction key is formed of up/down keys. For example, a first direction may indicate an upward direction, and a first direction key may be formed of an up key. Also, a second direction may indicate a downward direction, and a second direction key may be formed of a down key. However, the present exemplary embodiment is not limited thereto, and the first direction may indicate a leftward direction, and the second direction may indicate a rightward direction.

For example, the second user interface 250 may receive an input of pressing the first direction key. The image display apparatus 100, in response to the input of the first direction key, may divide the display 120 into a plurality of areas, and may be controlled to display a plurality of images corresponding to next channels after a channel image that is currently displayed, in the divided areas. Also, the second user interface 250 may receive an input of pressing the second direction key. The image display apparatus 100, in response to the input of the second direction key, divide the display 120 into a plurality of areas, and may be controlled to display a plurality of images corresponding to previous channels before a channel image that is currently displayed, in the divided areas.

The output interface 260 may output an image or sound signal corresponding to the signal received from the image display apparatus 100 or to the manipulation of the second user interface 250. The user may recognize the operation of the second user interface 250 or the control of the image display apparatus 100, through the output interface 260.

In an example, the output interface 260 may include a light-emitting diode (LED) module that is lit when the second user interface 250 is manipulated or a signal is transceived with the image display apparatus 100 through the wireless communication interface 210, a vibration module that generates vibration, a sound output module that outputs sound, and a display module that outputs an image.

The second storage 240 may store various types of programs, application data, etc. for the control or operation of the control apparatus 200.

The second controller 230 controls items related to the control of the control apparatus 200. The second controller 230 may transmit a signal corresponding to the manipulation of a predetermined key of the second user interface 250, through the wireless communication interface 210.

The user interface 130 of the image display apparatus 100 may receive the signal that the control apparatus 200 transmits through the IR module according to the IR communication protocol. Also, the transmission signal of the control apparatus 200 input to the image display apparatus 100 through the user interface 130 is transmitted to the controller 140 of the image display apparatus 100. The controller 140 may determine information of the operation and key manipulation of the control apparatus 200 from the signal transmitted from the control apparatus 200, and control the image display apparatus 100 corresponding to the determined information.

FIGS. 5, 6, 7A and 7B are views of menus for setting the image display apparatus 100 to operate in a multidivisional screen mode when a channel-up input or a channel-down input is received, according to an exemplary embodiment.

Figure 5:
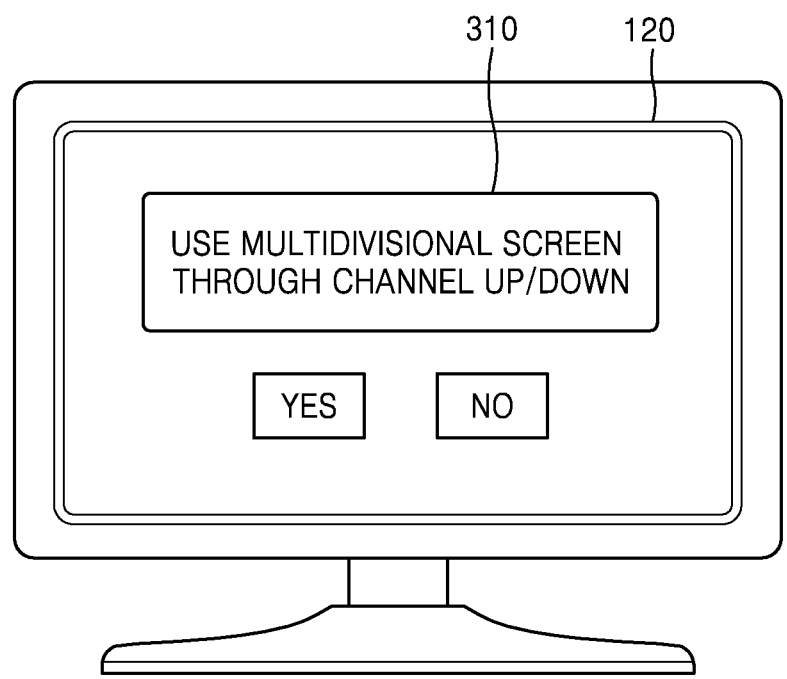

Referring to FIG. 5, the display 120 displays a first menu screen based on a user input. The user input may be one of various types of inputs such as an input of pressing a key included in the control apparatus 200, a motion input, a voice input, etc.

Figure 6:
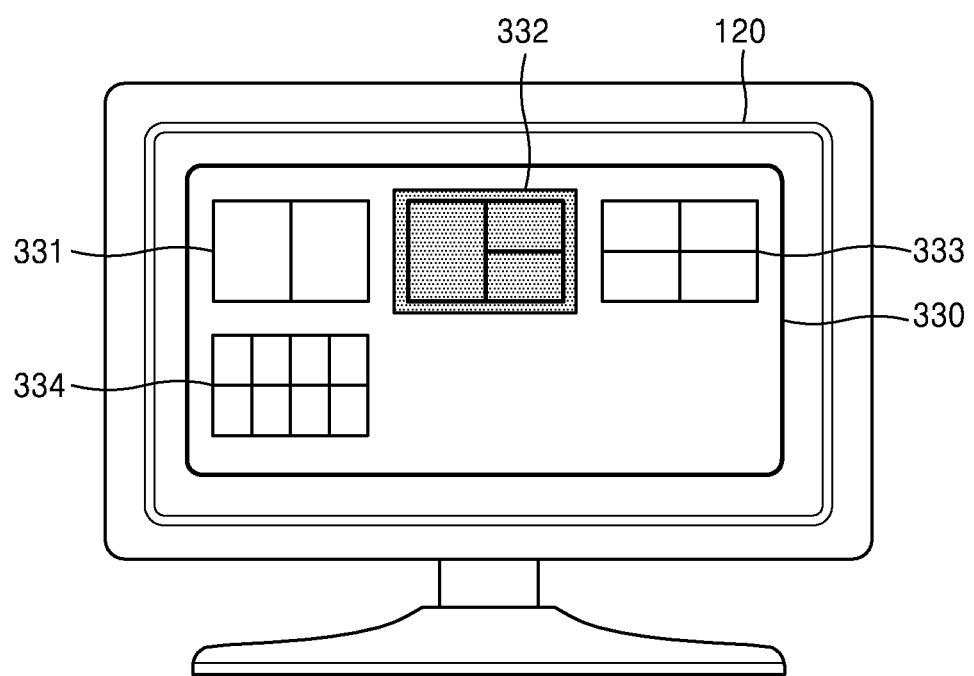

The display 120 displays a message 310 asking whether to use a multidivisional screen through channel up/down, in an area of the first menu screen. Also, the display 120 displays a YES button and a NO button on the first menu screen. When the user selects the YES button, as illustrated in FIG. 6, the display 120 displays a second menu screen 330 for selecting a layout of the multidivisional screen. In contrast, when the user selects the NO button, the display 120 may terminate displaying of the first menu screen.

Referring to FIG. 6, the layout of the multidivisional screen includes a two-divisional array 331 in which the display 120 is divided into two areas, a three-divisional array 332 in which the display 120 is divided into three areas, a four-divisional array 333 in which the display 120 is divided into four areas, and an eight-divisional array 334 in which the display 120 is divided into eight areas. However, the present exemplary embodiment is not limited thereto, the layout of the multidivisional screen may further include a sixteen-divisional array, a thirty-two divisional array, etc., and a layout may be set based on a user input.

When the layout of the multidivisional screen is set to any one of the above-described layouts, the image display apparatus 100 that enters a multidivisional screen mode may divide the display 120 into the set layout.

Also, when any one of the layouts displayed on the display 120 is selected, as illustrated in FIG. 7A, the display 120 displays a third menu screen 350 for mapping a channel group to each area included in the selected layout.

For example, as illustrated in FIG. 7A, when the display 120 is set to a three-divisional array, a channel group may be mapped to each of three areas 351, 352, and 353. The channel group may be a general channel group, a favorite channel group, a channel-by-genre group, etc. However, the present exemplary embodiment is not limited thereto, and the channel group may include various channel groups.

The general channel group may be a group including all channels provided by the image display apparatus 100. Also, the favorite channel group may be a group including channels that a user prefers, and may be set in advance according to a user input. Alternatively, the image display apparatus 100 may automatically set the favorite channel group by analyzing channels that the user frequently watches. The channel-by-genre group may be a group obtained by classifying channels into each genre according to features of the channels, for example, movie, music, drama, entertainment, sports, comedy, documentary, etc.

Accordingly, the image display apparatus 100 may map any one of the general channel group, the favorite channel group, and the channel-by-genre group to each of the three areas 351, 352, and 353 based on the user input. For example, as illustrated in FIG. 7A, the user may select any one of the three areas 351, 352, and 353, and select a channel group to be mapped to the selected area.

Accordingly, as illustrated in FIG. 7B, the general channel group is mapped to the first area 351, the favorite channel group is mapped to the second area 352, and the channel-by-genre group is mapped to the third area 353. When the respective channel groups are mapped to the three areas 351, 352, and 353, the channel change in each area may be performed between channels included in the relevant channel group.

For example, when an input for channel-up is received, the image display apparatus 100 may display in the first area 351 an image corresponding to a channel set to a next channel after a current channel, that is, a channel corresponding to an image currently displayed on the display 120, among the channels included in the general channel group. Also, the image display apparatus 100 may display in the second area 352 an image corresponding to a channel set to a next channel after the current channel among the channels included in the favorite channel group. Also, when the current channel is a movie channel, the image display apparatus 100 may display in the third area 353 an image corresponding to a channel set to a next channel after the current channel among the channels included in a movie channel group. However, the present exemplary embodiment is not limited thereto.

In contrast, when an input for channel-down is received, the image display apparatus 100 may display in the first area 351 an image corresponding to a channel set to a previous channel before a current channel among the channels included in the general channel group. Also, the image display apparatus 100 may display in the second area 352 an image corresponding to a channel set to a previous channel before the current channel among the channels included in the favorite channel group. Also, when the current channel is a movie channel, the image display apparatus 100 may display in the third area 353 an image corresponding to a channel set to a previous channel before the current channel among the channels included in the movie channel group. However, the present exemplary embodiment is not limited thereto.

Also, as described above, when no channel group is separately set to each area, the general channel group may be automatically mapped to the areas.

Also, when receiving the input for channel-up or channel-down, the image display apparatus 100 may set the current channel, which is not changed to the next channel or the previous channel, to be continuously displayed without change in any one of the divided areas, which is described below in detail with reference to FIG. 12.

Figure 8A:
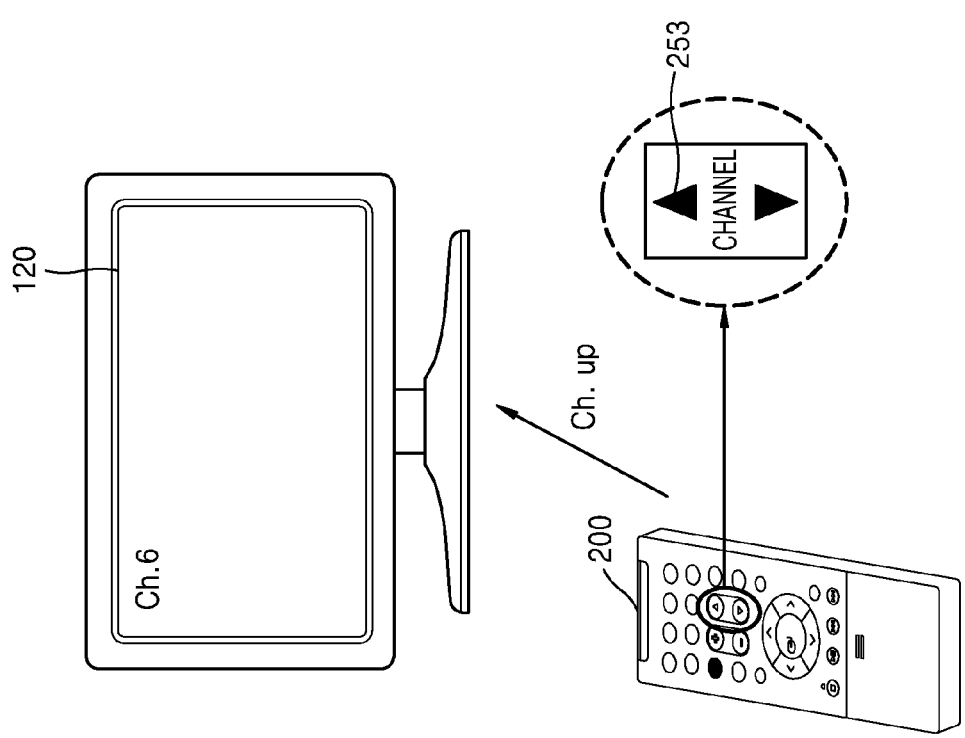
FIGS. 8A and 8B are diagrams illustrating a method of displaying an image according to an exemplary embodiment.
Figure 8B:
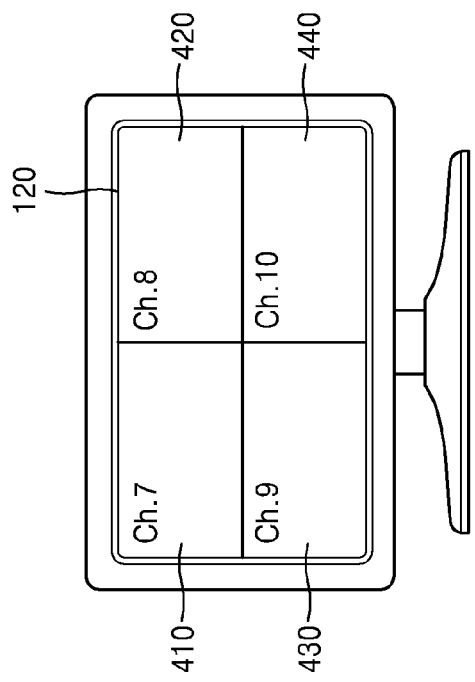

FIGS. 8A and 8B are diagrams illustrating a method of displaying an image according to an exemplary embodiment;

The image display apparatus 100 may display an image corresponding to a channel. For example, a plurality of channels may have different channel numbers, and each of the channels may be identified by a channel number.

Also, the order of the channels may be determined by channel numbers of the channels. The order of the channels may be determined from a channel having a low channel number to a channel having a high channel number. For example, a next channel after Channel 6 having a channel number of 6 may be Channel 7 having a channel number of 7. A next channel after Channel 7 may be Channel 8 having a channel number of 8. Although the channel number may not be consecutive, for convenience of explanation, the channel number is assumed to be consecutive in the general channel group.

Also, the order of channels may be determined from a channel having a high channel number to a channel having a low channel number. For example, a next channel after Channel 8 having a channel number of 8 may be Channel 7 having a channel number 7. A next channel after Channel 7 having a channel number of 7 may be Channel 6 having a channel number 6.

Also, the order of channels may be arbitrarily set by the user. However, in exemplary embodiments, for convenience of explanation, an example in which the order of channels is determined from a channel having a low channel number to a channel having a high channel number is described.

Also, a next channel after a last channel of a plurality of channels may be set to a first channel of the channels. For example, when the channels include Channel 1 Ch. 1 to Channel 99 Ch. 99, a next channel after the last channel that is Ch. 99 may be set to the first channel that is Ch. 1. However, the present exemplary embodiment is not limited thereto.

Referring back to FIG. 8A, the image display apparatus 100 displays a screen of Channel 6 having a channel number of 6 among the channels. In this state, the image display apparatus 100 receives an input for channel-up. For example, the user presses a first direction key 253 indicating an upward direction of the two-direction key included in the control apparatus 200. When the image display apparatus 100 receives a user input for channel-up, for example, an input of pressing the first direction key 253, the image display apparatus 100, as illustrated in FIG. 8B, divides the display 120 into a plurality of areas.

In this state, the image display apparatus 100, as described with reference to FIG. 6, may divide the display 120 in a preset layout. The image display apparatus 100 displays each of images corresponding to the next channels after Channel 6 in each of the divided areas. For example, when the areas include first to fourth areas 410, 420, 430, and 440, as illustrated in FIG. 8B, an image corresponding to Channel 7 Ch. 7 that is a next channel after Channel 6 Ch. 6 is displayed in the first area 410, an image corresponding to Channel 8 Ch. 8 that is a next channel after Ch. 7 is displayed in the second area 420, an image corresponding to Channel 9 Ch. 9 that is a next channel after Ch. 8 is displayed in the third area 430, and an image corresponding to Channel 10 Ch. 10 that is a next channel after Ch. 9 is displayed in the fourth area 440.

Figure 9B:
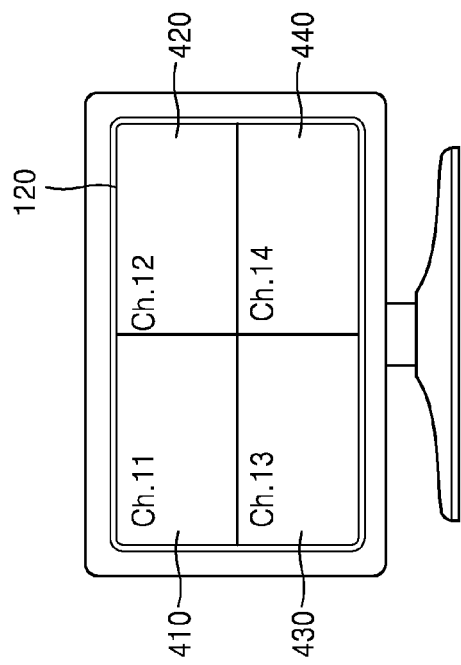
FIGS. 9A and 9B are diagrams illustrating a method of displaying an image according to an exemplary embodiment.
Figure 9A:
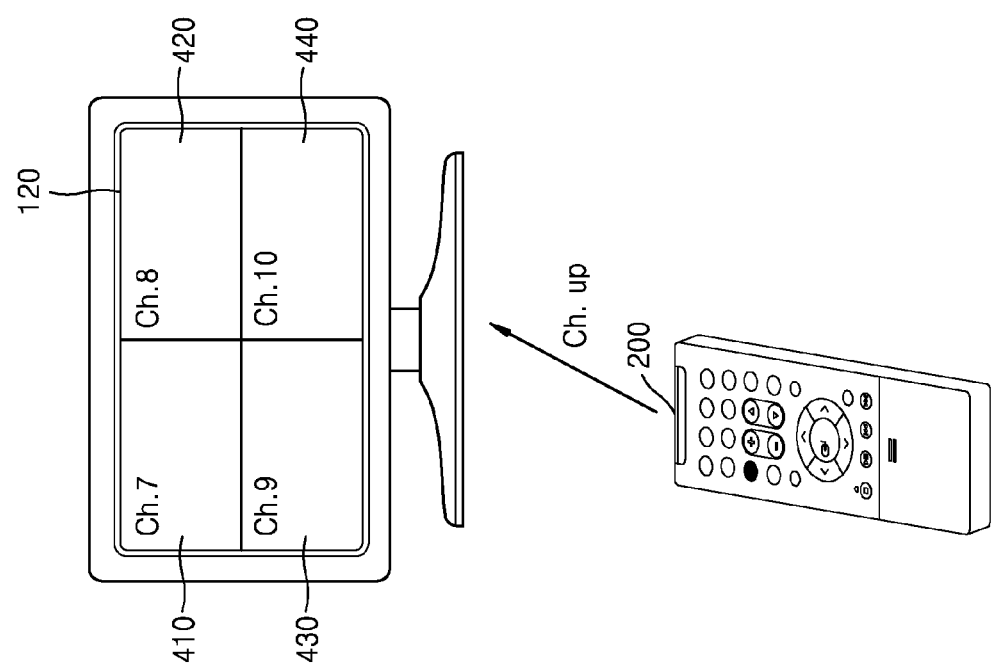

FIGS. 9A and 9B are diagrams illustrating a method of displaying an image according to an exemplary embodiment.

Referring to FIG. 9A, the image display apparatus 100 displays images corresponding to different channels in a plurality of areas. As illustrated in FIG. 9A, the areas include the first to fourth areas 410, 420, 430, and 440, and an image corresponding to Ch. 7, an image corresponding to Ch. 8, an image corresponding to Ch. 9, and an image corresponding to Ch. 10 are sequentially displayed in the first to fourth areas 410, 420, 430, and 440, respectively.

Referring to FIG. 9A, the image display apparatus 100 receives an input for channel-up. For example, the user presses the first direction key 253 indicating the upward direction of the two-direction key included in the control apparatus 200. When the image display apparatus 100 receives a user input for channel-up, for example, an input of pressing the first direction key 253, the image display apparatus 100 displays the images displayed in the areas by changing the channels of the images.

In this state, the image display apparatus 100 increases the channel number in each area based on the number of the divided areas, and displays an image corresponding to a changed channel number. For example, when the display 120 is divided into four areas, the channel number in each area is increased by four. As illustrated in FIG. 9B, the image display apparatus 100 changes Ch. 7 to Channel 11 Ch. 11 in the first area 410, and displays an image corresponding to the changed Ch. 11. The image display apparatus 100 changes Ch. 8 to Channel 12 Ch. 12 in the second area 420, and displays an image corresponding to the changed Ch. 12. The image display apparatus 100 changes Ch. 9 to Channel 13 Ch. 13 in the third area 430, and displays an image corresponding to the changed Ch. 13. The image display apparatus 100 changes Ch. 10 to Channel 14 Ch. 14 in the fourth area 440, and displays an image corresponding to the changed Ch. 14. However, the present exemplary embodiment is not limited thereto.

Figure 10B:
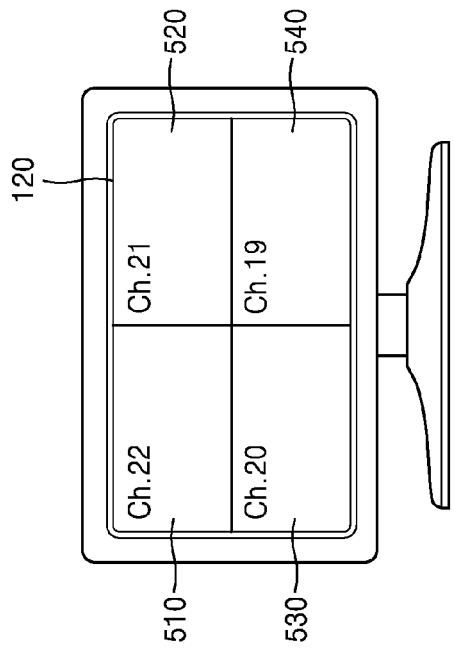
FIGS. 10A and 10B are diagrams illustrating a method of displaying an image according to an exemplary embodiment.
Figure 10A:
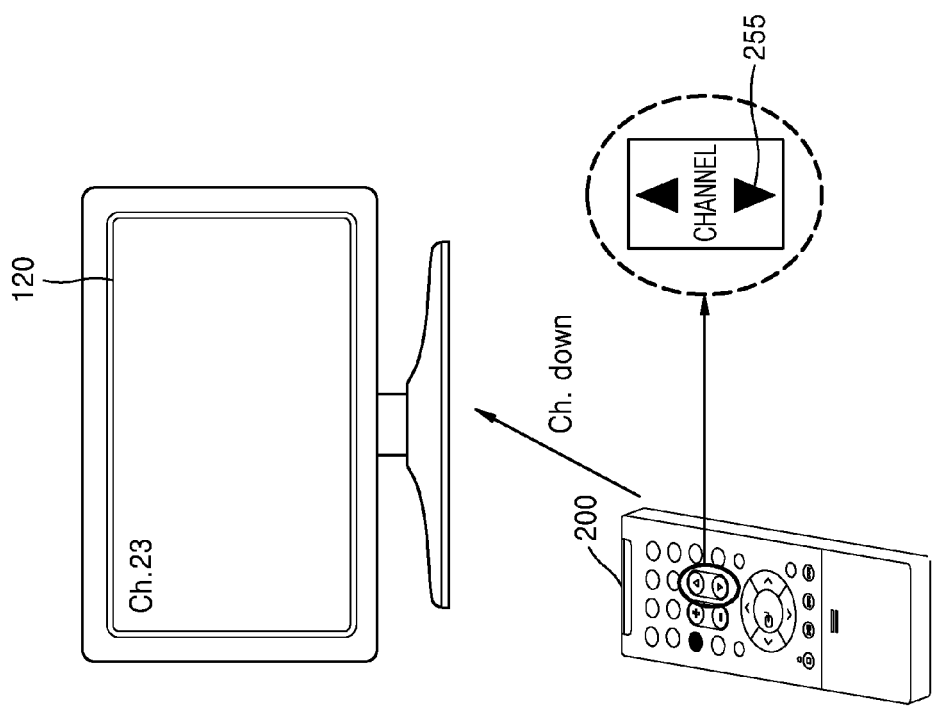

FIGS. 10A and 10B are diagrams illustrating a method of displaying an image according to an exemplary embodiment.

Referring to FIG. 10A, the image display apparatus 100 displays an image corresponding to Channel 23 having a channel number of 23 among the channels. Also, the image display apparatus 100 receives an input for channel-down. For example, the user presses a second direction key 255 indicating a downward direction of the two-direction key included in the control apparatus 200. When the image display apparatus 100 receives a user input for channel-down, for example, an input of pressing the second direction key 255, the image display apparatus 100 divides the display 120 into a plurality of areas, as illustrated in FIG. 10B.

The image display apparatus 100, as described with reference to FIG. 6, may divide the display 120 in a preset layout. The image display apparatus 100 displays each of the images corresponding to previous channels before Ch. 23 in each of the divided areas. For example, as illustrated in FIG. 10B, when the areas include first to fourth areas 510, 520, 530, and 540, an image corresponding to Channel 22 Ch. 22 that is a previous channel before Channel 23 Ch. 23 is displayed in the first area 510, an image corresponding to Channel 21 Ch. 21 that is a previous channel before Channel 22 Ch. 22 is displayed in the second area 520, an image corresponding to Channel 20 Ch. 20 that is a next channel after Ch. 21 is displayed in the third area 530, and an image corresponding to Channel 19 Ch. 19 that is a next channel after Ch. 20 is displayed in the fourth area 540.

Figure 11B:
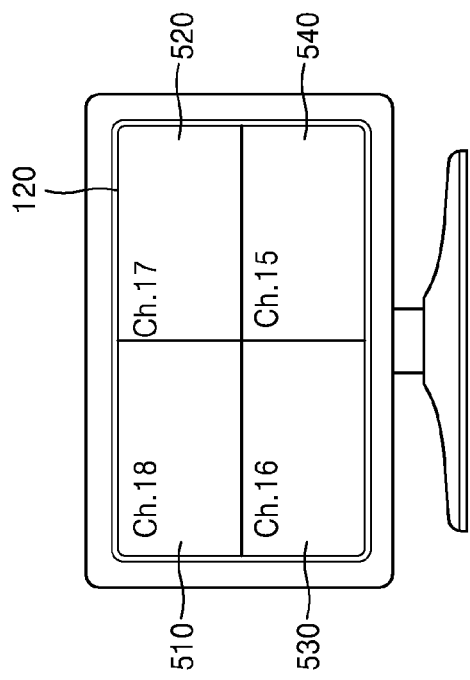
FIGS. 11A and 11B are diagrams illustrating a method of displaying an image according to an exemplary embodiment.
Figure 11A:
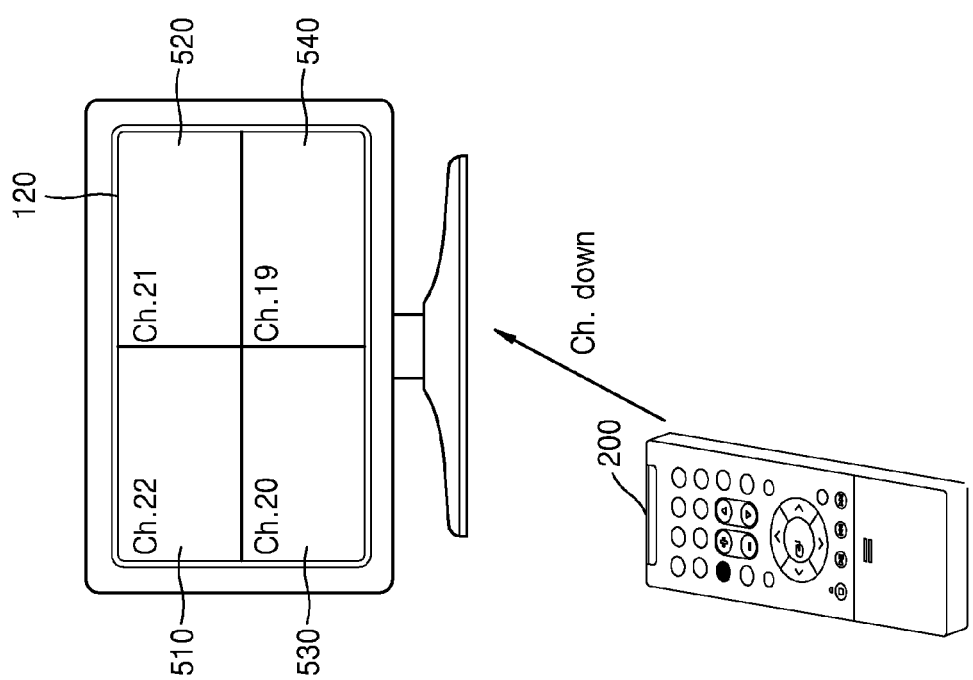

FIGS. 11A and 11B are diagrams illustrating a method of displaying an image according to an exemplary embodiment;

Referring to FIG. 11A, the image display apparatus 100 displays images corresponding to different channels in a plurality of areas. As illustrated in FIG. 11A, the areas include first to fourth areas 510, 520, 530, and 540, and an image corresponding to Ch. 22, an image corresponding to Ch. 21, an image corresponding to Ch. 20, and an image corresponding to Ch. 19 are sequentially displayed the first to fourth areas 510, 520, 530, and 540, respectively.

Referring to FIG. 11A, the image display apparatus 100 receives an input for channel-down. For example, the user presses the second direction key 255 indicating the downward direction of the two-direction key included in the control apparatus 200. When the image display apparatus 100 receives a user input for channel-down, for example, an input of pressing the second direction key 255, the image display apparatus 100 changes channels of images displayed in the areas, and displays images of the changed channels.

In this state, the image display apparatus 100 decreases the channel number in each area based on the number of the divided areas, and displays an image corresponding to the changed channel number. For example, when the display 120 is divided into four areas, the channel number in each area is decreased by four. As illustrated in FIG. 11B, the image display apparatus 100 changes Ch. 22 to Ch. 18 in the first area 510, and displays an image corresponding to the changed channel Ch. 18. The image display apparatus 100 changes Ch. 21 to Ch. 17 in the second area 520, and displays an image corresponding to the changed channel Ch. 17. The image display apparatus 100 changes Ch. 20 to Ch. 16 in the third area 530, and displays an image corresponding to the changed channel Ch. 16. The image display apparatus 100 changes Ch. 19 to Ch. 15 in the fourth area 540, and displays an image corresponding to the changed channel Ch. 15. However, the present exemplary embodiment is not limited thereto.

As described above, when the input for channel-up or channel-down is input, the image display apparatus 100 according to the present exemplary embodiment enters a multidivisional screen mode, and simultaneously displays images corresponding to the next channels or previous channels before the current channel, thereby simultaneously zapping a plurality of channels.

Figure 12C:
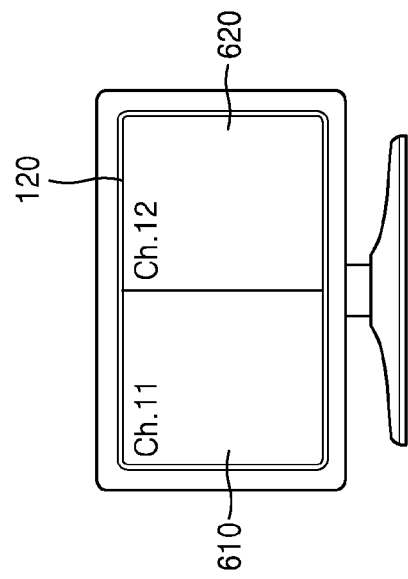
FIGS. 12A to 12C are diagrams illustrating a method of displaying an image according to an exemplary embodiment.
Figure 12B:
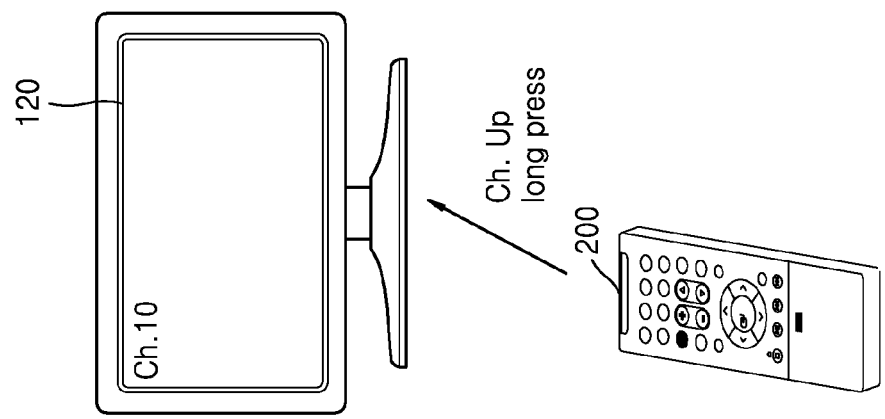
Figure 12A:
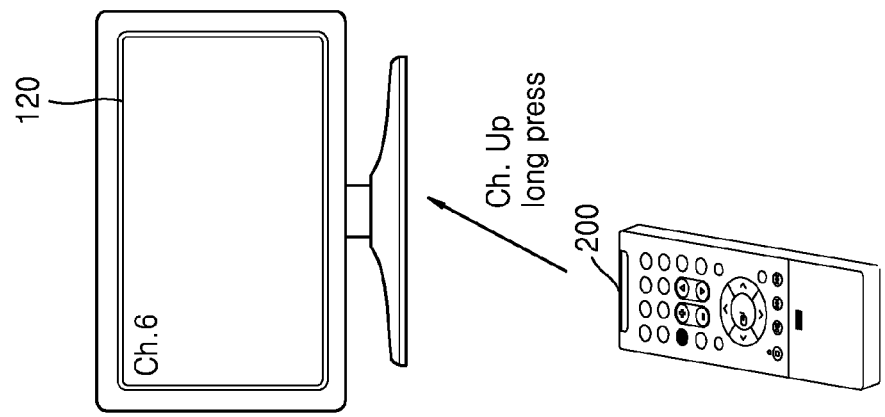

FIGS. 12A to 12C are diagrams illustrating a method of displaying an image according to an exemplary embodiment Referring to FIG. 12A, the image display apparatus 100 displays an image corresponding to a first channel, that is, a first channel image, in the display 120. The first channel may be a preset channel or a channel selected by the user.

The user performs an input for channel-up, for example, a long press of a channel-up key included in the control apparatus 200, for example, the first direction key 253. When the user presses the channel-up key for the long press, as illustrated in FIG. 12B, the image display apparatus 100 sequentially changes channels to next channels after the first channel. For example, when the first channel is Ch. 6, while receiving the long press of the channel-up key, the image display apparatus 100 sequentially change channels from Ch. 6 to Ch. 7, from Ch. 7 to Ch. 8, from Ch. 9 to Ch. 10. Also, the image display apparatus 100 displays an image corresponding to a changed channel in the display 120.

In this state, when the channel-up key is pressed for more than a preset time, that is, a first time, as illustrated in FIG. 12C, the image display apparatus 100 divides the display 120 into a plurality of areas, and displays images corresponding to next channels in the divided areas. The next channels signify next channels after a channel corresponding to the image displayed in the display 120 before the display 120 is divided into the areas.

For example, when the channel-up key is pressed for more than one hour, the display 120 is divided into a plurality of areas including a first area 610 and a second area 620 at a time point when an image corresponding to Ch. 10 is displayed, as illustrated in FIG. 12C, and thus images corresponding to Ch. 11 and Ch. 12 that are the next channels after Ch. 10 are displayed in the first area 610 and the second area 620. In other words, an image corresponding to Ch. 11 that is the next channel after Ch. 10 is displayed in the first area 610, and an image corresponding to Ch. 12 that is the next channel after Ch. 11 is displayed in the second area 620.

Alternatively, although FIG. 12 illustrates only the case of receiving an input for channel-up, the method of displaying an image described with reference to FIG. 12 may be identically applied to the case of receiving an input for channel-down.

For example, when the channel-down key, for example, the second direction key 255, included in the control apparatus 200 is pressed for the long press, the image display apparatus 100 may sequentially change channels to previous channels before the first channel in the same manner as when the input for channel-up is received. Also, when the channel-down key is pressed for more than a preset time, for example, the first time, the image display apparatus 100 may divide the display 120 into a plurality of areas. The image display apparatus 100 may display images corresponding to the previous channels in the divided areas. The previous channels may signify the previous channels before a channel corresponding to an image displayed on the display 120 before the display 120 is divided into the area.

FIGS. 13A to 13C are diagrams illustrating a method of displaying an image according to an exemplary embodiment.

FIG. 13A may be identical to FIG. 12C. For example, the image display apparatus 100 divides the display 120 into the first area 610 and the second area 620, and displays images corresponding to next channels in the first area 610 and the second area 620.

In this state, when the channel-up key is pressed for more than a preset time, that is, a second time, as illustrated in FIG. 13B, the image display apparatus 100 divides the display 120 from two areas to four areas, and displays images corresponding to next channels in the divided four areas. The next channels signify next channels after a channel corresponding to the image displayed in each of the two areas, that is, the first area 610 and the second area 620, before the display 120 is divided into the four areas.

For example, as illustrated in FIG. 13A, when the display 120 is divided into four areas including third to sixth areas 630, 640, 650, and 660 at a time point when an image corresponding to Ch. 11 is displayed in the first area 610 and an image corresponding to Ch. 12 is displayed in the second area 620, images corresponding to Ch. 13, Ch. 14, Ch. 15, and Ch. 16 that are next channels after Ch. 11 and Ch. 12 are displayed in the third to sixth areas 630, 640, 650, and 660, respectively. In other words, an image corresponding to Ch. 13 that is a next channel after Ch. 12 is displayed in the third area 630, an image corresponding to Ch. 14 that is a next channel after Ch. 13 is displayed in the fourth area 640, an image corresponding to Ch. 15 that is a next channel after Ch. 14 is displayed in the fifth area 650, and an image corresponding to Ch. 16 that is a next channel after Ch. 15 is displayed in the sixth area 660.

Also, in a state in which the display 120 is divided into four areas, when the channel-up key is pressed for more than a preset time, that is, a third time, as illustrated in FIG. 13C, the image display apparatus 100 divides the display 120 into eight areas, and displays images corresponding to next channels in the divided eight areas. The next channels signify the next channels after the channels corresponding to the images displayed in the four areas before the display 120 is divided into the eight areas.

For example, when the display 120 is divided into eight areas including seventh to fourteenth areas 671, 672, 673, 674, 675, 676, 677, and 678 at a time point when images corresponding to Ch. 13, Ch. 14, Ch. 15, and Ch. 16 are displayed in the third to sixth areas 630, 640, 650, and 660, respectively, images corresponding to Ch. 17, Ch. 18, Ch. 19, Ch. 20, Ch. 21, Ch. 22, Ch. 23, and Ch. 24 that are next channels after Ch. 13, Ch. 14, Ch. 15, and Ch. 16 are displayed in the seventh to fourteenth areas 671, 672, 673, 674, 675, 676, 677, and 678, respectively.

Alternatively, although FIG. 13 illustrates only the case of receiving an input for channel-up, the method of displaying an image described with reference to FIG. 13 may be identically applied to the case of receiving an input for channel-down.

For example, when the channel-down key is pressed for more than a preset time, that is, the second time, the image display apparatus 100 may divide the display 120 from the two areas to four areas. Also, the image display apparatus 100 may display images corresponding to previous channels in the divided four areas. The previous channels may signify next channels after the channels corresponding to the images displayed in the two areas before the display 120 is divided into the four areas.

Also, in a state in which the display 120 is divided into the four areas, when the channel-down key is pressed for more than a preset time, that is, the third time, the image display apparatus 100 may divide the display 120 into eight areas. The image display apparatus 100 may display images corresponding to the previous channels in the divided eight areas. The previous channels may signify next channels after the channels corresponding to the images displayed in the four areas before the display 120 is divided into the eight areas.

FIGS. 14A to 14C are diagrams illustrating a method of displaying an image according to an exemplary embodiment;

Referring to FIG. 14A, the image display apparatus 100 displays an image, that is, a first channel image, corresponding to a first channel in the display 120. The first channel may be a preset channel or a channel selected by a user.

The user performs an input for channel-up. For example, the user presses the channel-up key, for example, the first direction key 253, included in the control apparatus 200. When the user presses the channel-up key, as illustrated in FIG. 14B, the image display apparatus 100 divides the display 120 into a plurality of areas. Also, the image display apparatus 100 displays the first channel image in the first area of the divided areas, and displays images corresponding to next channels after the first channels in the areas other than the first area. For example, when the first channel is Ch. 6 and the image display apparatus 100 divides the display 120 into four areas 710, 720, 730, and 740, as illustrated in FIG. 14B, the image display apparatus 100 displays an image corresponding to Ch. 6 in the first area 710, and displays images corresponding to Ch. 7, Ch. 8, and Ch. 9 that are next channels after Ch. 6 in the second to fourth areas 720, 730, and 740, respectively.

As illustrated in FIG. 14B, when the user presses again the channel-up key included in the control apparatus 200, as illustrated in FIG. 14C, the image display apparatus 100 displays an image corresponding to Ch. 6 that is the first channel, in the first area 710, and displays the images displayed in the other areas by changing the images respectively to images corresponding to the next channels. For example, the images corresponding to Ch. 7, Ch. 8, and Ch. 9 displayed in the second to fourth areas 720, 730, and 740 are displayed by being changed to the images corresponding to Ch. 10, Ch. 11, and Ch. 12 that are next channels after Ch. 7, Ch. 8, and Ch. 9, respectively.

Alternatively, although FIG. 14 illustrated only the case of receiving an input for channel-up, the method of displaying an image described with reference to FIG. 14 may be identically applied to the case of receiving an input for channel-down.

For example, in a state in which an image corresponding to the first channel is displayed in the display 120, when the channel-down key included in the control apparatus 200, for example, the second direction key, is pressed, the image display apparatus 100 may divide the display 120 into a plurality of areas. Also, the image display apparatus 100 may display the first channel image in the first area of the divided areas, and display images corresponding to previous channels before the first channel in the areas other than the first area.

Also, when the user presses again the channel-down key included in the control apparatus 200, the image display apparatus 100 may display the image corresponding to the first channel in the first area, and display the images displayed in the other areas by changing the images respectively to images corresponding to the previous channels.

FIGS. 15A to 15C are diagrams illustrating a method of displaying an image according to an exemplary embodiment.

Referring to FIG. 15A, the image display apparatus 100 displays images corresponding to different channels in a plurality of areas. The areas include first to fourth areas 810, 820, 830, and 840. The images corresponding to Ch. 6, Ch. 7, Ch. 8, and Ch. 9 are sequentially displayed in the first to fourth areas 810, 820, 830, and 840, respectively.

Referring to FIG. 15A, the user performs an input for channel-up. For example, the user presses the channel-up key included in the control apparatus 200, for example, the first direction key 253. When the user presses the channel-up key, the image display apparatus 100 displays the images displayed in the areas by changing the channels of the images. Because this is already described above in detail with reference to FIG. 9, a redundant description thereof is omitted.

As illustrated in FIG. 15B, the image display apparatus 100 displays images corresponding to Ch. 10, Ch. 11, Ch. 12, and Ch. 13 that are next channels after Ch. 6, Ch. 7, Ch. 8, and Ch. 9, in the first to fourth areas 810, 820, 830, and 840, respectively.

The user selects at least one of the images displayed in the image display apparatus 100. For example, the user selects the image corresponding to Ch. 13 displayed in the fourth area 840 among the images corresponding to Ch. 10, Ch. 11, Ch. 12, and Ch. 13. Alternatively, although FIG. 15B illustrates that only one image is selected, the present exemplary embodiment is not limited thereto, and a plurality of images may be selected.

After selecting an image, the user presses the channel-up key, for example, the first direction key 253. When the user presses the channel-up key, the image display apparatus 100 continuously displays the image corresponding to Ch. 13 in the fourth area 840, and displays the images corresponding to next channels after Ch. 10, Ch. 11, Ch. 12, and Ch. 13 in the areas 810, 820, and 830 other than the fourth area 840. For example, as illustrated in FIG. 15C, the images corresponding to Ch. 10, Ch. 11, and Ch. 12 displayed in the first to third areas 810, 820, 830 are displayed by being changed to the images corresponding to Ch. 14, Ch. 15, and Ch. 16, respectively, which are next channels after Ch. 10, Ch. 11, Ch. 12, and Ch. 13.

Alternatively, although FIG. 15 illustrates only the case of receiving an input for channel-up, the method of displaying an image described with reference to FIG. 15 may be identically applied to the case of receiving an input for channel-down.

For example, when at least one of a plurality of images is selected, and the channel-down key included in the control apparatus 200, for example, the second direction key 255, is pressed, the image display apparatus 100 may continuously display the selected image, and display images corresponding to previous channels in the areas other than the area where the selected image is displayed.

FIGS. 16A and 16B are diagrams illustrating a method of displaying an image according to an exemplary embodiment.

Referring to FIG. 16A, the image display apparatus 100 displays images corresponding to different channels in a plurality of areas. As illustrated in FIG. 16A, the areas include first to fourth areas 910, 920, 930, and 940, and the images corresponding to Ch. 11, Ch. 12, Ch. 13, and Ch. 14 are sequentially displayed in the first to fourth areas 910, 920, 930, and 940, respectively.

In this state, the image display apparatus 100 receives an input of selecting any one of the images displayed in the areas, e.g., the image corresponding to Ch. 12.

When any one image is selected, the image display apparatus 100, as illustrated in FIG. 16B, displays the selected image in the areas, e.g., the image corresponding to Ch. 12. In other words, the image display apparatus 100 incorporates the divided areas into one area, and displays the selected image in the entire area of the display 120.

Figure 17B:
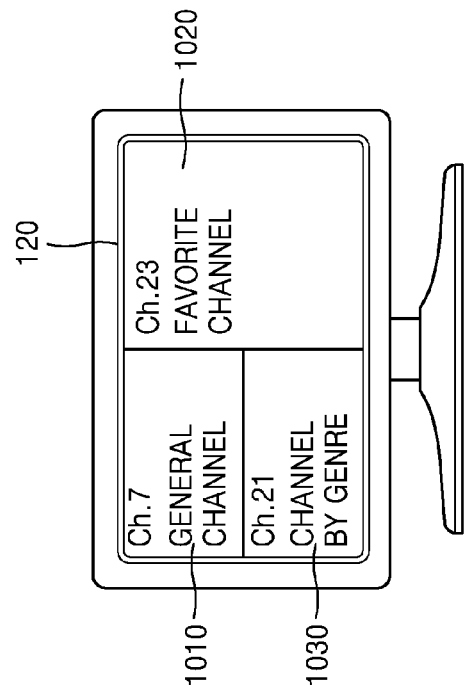
FIGS. 17A and 17B are diagrams illustrating a method of displaying an image according to an exemplary embodiment.
Figure 17A:
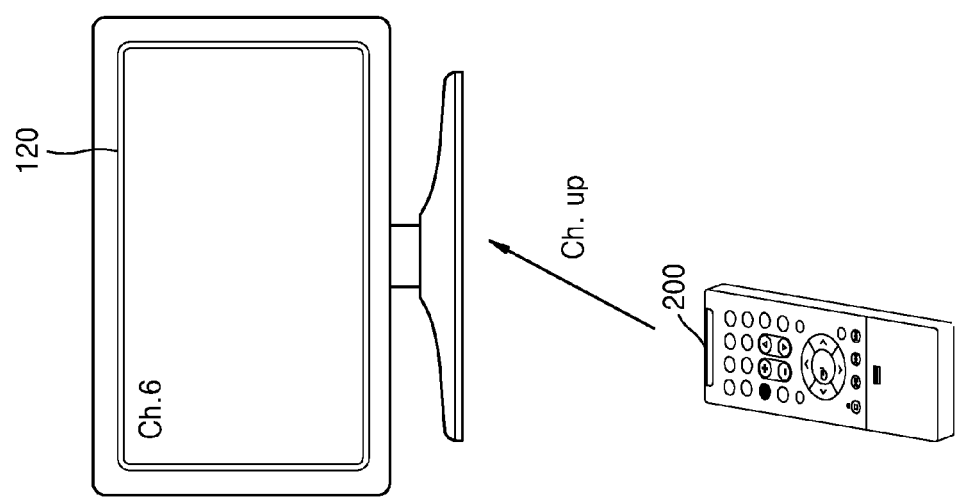

FIGS. 17A and 17B are diagrams illustrating a method of displaying an image according to an exemplary embodiment.

Referring to FIG. 17A, the image display apparatus 100 displays an image, that is, the first channel image, corresponding to the first channel, in the display 120. The first channel may be a preset channel or a channel selected by a user.

The user performs an input for channel-up. For example, the user presses the channel-up key included in the control apparatus 200, for example, the first direction key 253. When the user presses the channel-up key, as illustrated in FIG. 17B, the image display apparatus 100 divides the display 120 into a plurality of areas. Also, the image display apparatus 100 displays next channels after the first channel in the divided areas. In this state, the image display apparatus 100 displays an image corresponding to a channel set to a next channel after the first channel among the channels included in each of a plurality of channel groups, in each of the divided areas. For example, as described with reference to FIG. 7, each of the areas may be previously mapped to any one of the channel groups. The channel groups may include the general channel group, the favorite channel group, the channel-by-genre group, etc. The general channel group may be a group including general channels. Also, the favorite channel group may be a group including channels preferred by the user, and may be previously set by a user input. Alternatively, the favorite channel group may be automatically set by analyzing channels that the user frequently watches. The channel-by-genre group may be a group in which channels are classified by into one of genres such as movie, music, drama, entertainment, sports, comedy, documentary, etc.

Also, the image display apparatus 100 determines the number of the divided areas based on the number of channel groups in which the first channel is included. For example, when there are three channel groups in which the first channel is included, as illustrated in FIG. 17B, the image display apparatus 100 divides the display 120 into three areas including first, second, and areas 1010, 1020, and 1030. However, the present exemplary embodiment is not limited thereto.

For example, when the first channel is Ch. 6, the channel groups that include Ch. 6 are the general channel group, the favorite channel group, and the movie channel group. Accordingly, when the user presses the channel-up key, as illustrated in FIG. 17B, the image display apparatus 100 displays the image corresponding to Ch. 7 set to a next channel after Ch. 6 in the general channel group, in the first area 1010. Also, the image display apparatus 100 displays an image corresponding to Ch. 23 set to a next channel after Ch. 6 in the favorite channel group, in the second area 1020. Also, when Ch. 6 is a movie channel, the image display apparatus 100 displays an image corresponding to Ch. 21 set to a next channel after Ch. 6 in the movie channel group of the channel-by-genre group, in the third area 1030. However, the present exemplary embodiment is not limited thereto.

Alternatively, although FIG. 17 illustrates only the case of receiving an input for channel-up, the display method described with reference to FIG. 17 may be identically applied to the case of receiving an input for channel-down.

For example, in a state in which the image corresponding to the first channel is displayed in the image display apparatus 100, when the channel-down key included in the control apparatus 200, for example, the second direction key 255, is pressed, the image display apparatus 100 may divide the display 120 into a plurality of areas. Also, the image display apparatus 100 may display previous channels before the first channel in the divided areas. In this state, the image display apparatus 100 may display an image corresponding to a channel set to a previous channel before the first channel among the channels included in each of the channel groups, in each of the divided areas.

Figures 18A, 18B:
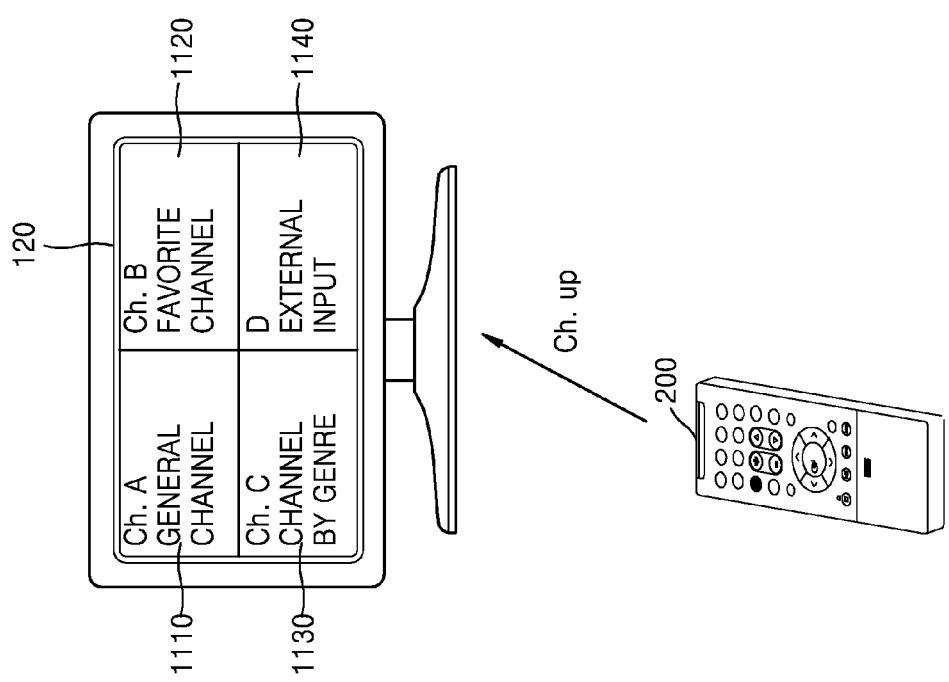
FIGS. 18A and 18B are diagrams illustrating a method of displaying an image according to an exemplary embodiment.

FIGS. 18A and 18B are diagrams illustrating a method of displaying an image according to an exemplary embodiment;

Referring to FIG. 18A, the image display apparatus 100 divides the display 120 into a plurality of areas, and displays channels included in each of a plurality of channel groups, in the areas. As illustrated in FIG. 18A, the image display apparatus 100 divides the display 120 into a plurality of areas including first to fourth areas 1110, 1120, 1130, and 1140, and each of the areas is mapped to any one of the channel groups, as described with reference to FIG. 7.

For example, the image display apparatus 100 displays the image corresponding to any one, for example, the first channel, of the channels included in the general channel group, in the first area 1110. Also, the image display apparatus 100 displays the image corresponding to any one, for example, the second channel, of the channels included in the favorite channel group, in the second area 1120. Also, the image display apparatus 100 displays the image corresponding to any one, for example, the third channel, of the channels included in the channel-by-genre group, in the third area 1130. The channel-by-genre group may include a movie channel group, a music channel group, a drama channel group, an entertainment channel group, a comedy channel group, a document channel group, etc.

Also, the image display apparatus 100 displays a content image received from the external apparatus in the fourth area 1140. The external apparatus may include an apparatus capable of storing contents, for example, a camera, a portable terminal, a storage medium, etc., but the present exemplary embodiment is not limited thereto. Also, the contents may include an image content, a moving picture content, a music content, text, etc. The image display apparatus 100 displays an image corresponding to any one, that is, a first content, of the contents received from the external apparatus.

For example, when the image display apparatus 100 is connected to a plurality of external apparatuses, the external apparatuses may have an order according to a preset standard. Also, when the content received from the external apparatus is plural or the content stored in the external apparatus is plural, the contents may have an order according to a preset standard. For example, the order of contents may be determined according to a content generation time or a content storing time, but the present exemplary embodiment is not limited thereto.

Referring again to FIG. 18A, the user performs an input for channel-up. For example, the user presses the channel-up key included in the control apparatus 200, for example, the first direction key 253. When the user presses the channel-up key, as illustrated in FIG. 18B, the image display apparatus 100 displays an image corresponding to a next channel in each of the channel groups. For example, the image display apparatus 100 displays an image corresponding to a channel Ch. A+1 set to a next channel after a channel Ch. A, that is, the first channel in the general channel group, in the first area 1110. Also, the image display apparatus 100 displays an image corresponding to a channel Ch. B+1 set to a next channel after a channel Ch. B in the favorite channel group, in the second area 1120. Also, the image display apparatus 100 displays an image corresponding to a channel Ch. C+1 set to a next channel after a channel Ch. C in the channel-by-genre group, in the third area 1130.

Also, the image display apparatus 100 may be connected to first and second external apparatuses. When a first content D is a content received from the first external apparatus, a content D+1 received from the second external apparatus that is set to a next apparatus of the first external apparatus may be displayed in the fourth area 1140. Alternatively, when only the first external apparatus is connected to the image display apparatus 100, an image corresponding to the content D+1 set to a next content of the first content D may be displayed in the fourth area 1140. However, the present exemplary embodiment is not limited thereto.

Alternatively, although FIGS. 18A and 18B illustrate only the case of receiving an input for channel-up, the method of displaying an image described with reference to FIG. 18 may be identically applied to the case of receiving an input for channel-down.

For example, as illustrated in FIG. 18A, in a state in which a channel included in each of the channel groups is indicated in each of the areas, when the channel-down key included in the control apparatus 200, for example, the second direction key 255, is pressed, the image display apparatus 100 may display an image corresponding to a previous channel in each of the channel groups.

Figure 19B:
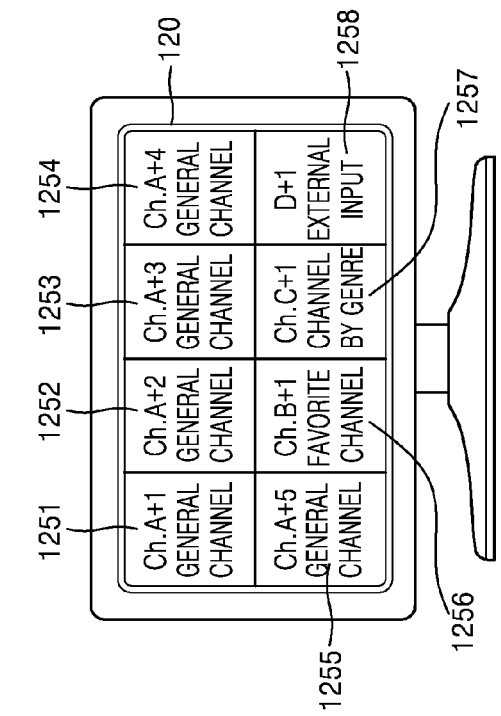
FIGS. 19A and 19B are diagrams illustrating a method of displaying an image according to an exemplary embodiment.
Figure 19A:
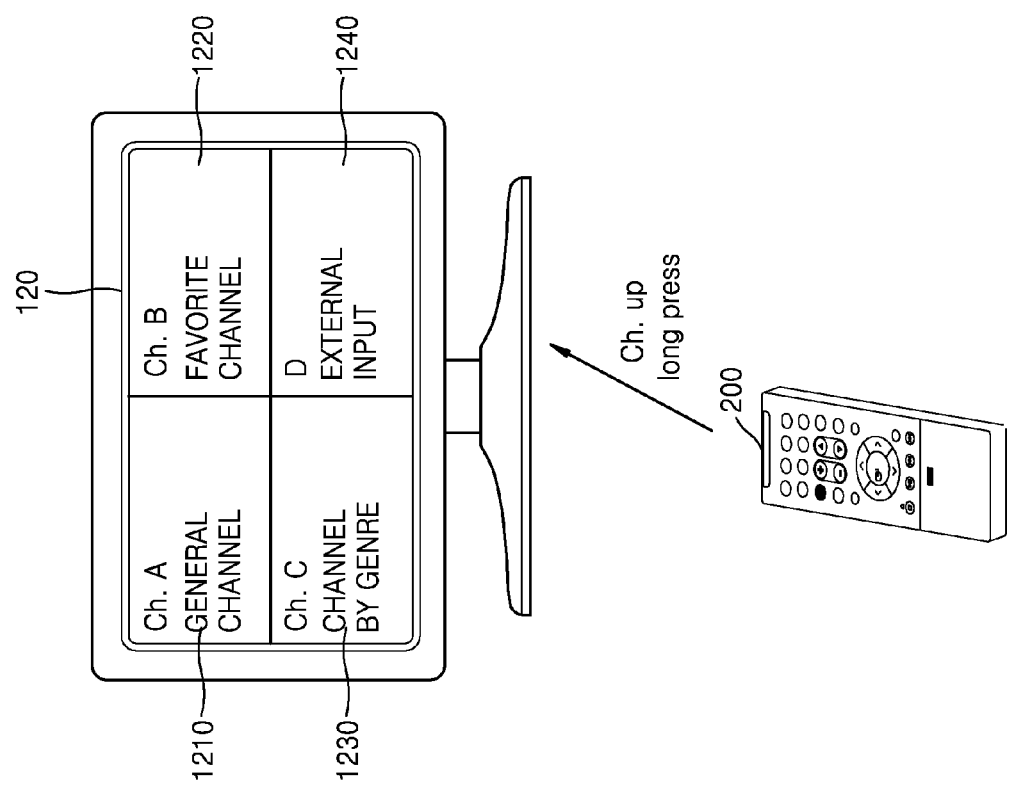

FIGS. 19A and 19B are diagrams illustrating a method of displaying an image according to an exemplary embodiment.

Referring to FIG. 19A, the image display apparatus 100 divides the display 120 into a plurality of areas, and displays a channel included in each of a plurality of channel groups, in each of the areas. FIG. 19A may be identical to FIG. 18A.

For example, the image display apparatus 100 displays an image corresponding to any one channel, for example, the first channel, of the channels included in the general channel group, in a first area 1210. Also, the image display apparatus 100 displays an image corresponding to any one channel, for example, the second channel, of the channels included in the favorite channel group, in a second area 1220. Also, the image display apparatus 100 displays an image corresponding to any one channel, for example, the third channel, of the channels included in the channel-by-genre group, in a third area 1230. Also, the image display apparatus 100 displays contents received from the external apparatus in a fourth area 1240.

The user presses, for a long press, the channel-up key included in the control apparatus 200, for example, the first direction key 253. For example, when the user presses the channel-up key for more than the preset time, that is, the third time, as illustrated in FIG. 19B, the image display apparatus 100 divides the display 120 into eight areas from the four areas.

The image display apparatus 100 sequentially displays channels Ch. A+1, Ch. A+2, Ch. A+3, Ch. A+4, and Ch. A+5 that are set to next channels after a first channel Ch. A in the general channel group, in first to fifth areas 1251, 1252, 1253, 1254, and 1255, respectively, of eight areas 1251, 1252, 1253, 1254, 1255, 1256, 1257, and 1258. Also, the image display apparatus 100 displays an image corresponding to a channel Ch. B+1 set to a next channel after the second channel Ch. B in the favorite channel group, in the sixth area 1256. Also, the image display apparatus 100 displays an image corresponding to a channel Ch. C+1 set to a next channel after the third channel Ch. C in the channel-by-genre group, in the seventh area 1257.

Also, the image display apparatus 100 may be connected to the first external apparatus and the second external apparatus. When the first contents D is received from the first external apparatus, the image display apparatus 100 may display a content D+1 received from the second external apparatus that is set to a next apparatus of the first external apparatus, in the eighth area 1258. Alternatively, when only the first external apparatus is connected to the image display apparatus 100, an image corresponding to the content D+1 set to a next content of the first content D may be displayed in the eighth area 1258. However, the present exemplary embodiment is not limited thereto.

Alternatively, although FIG. 19 illustrates only the case of receiving an input for channel-up, the method of displaying an image described with reference to FIG. 19 may be identically applied to the case of receiving an input for channel-down.

Figure 20:
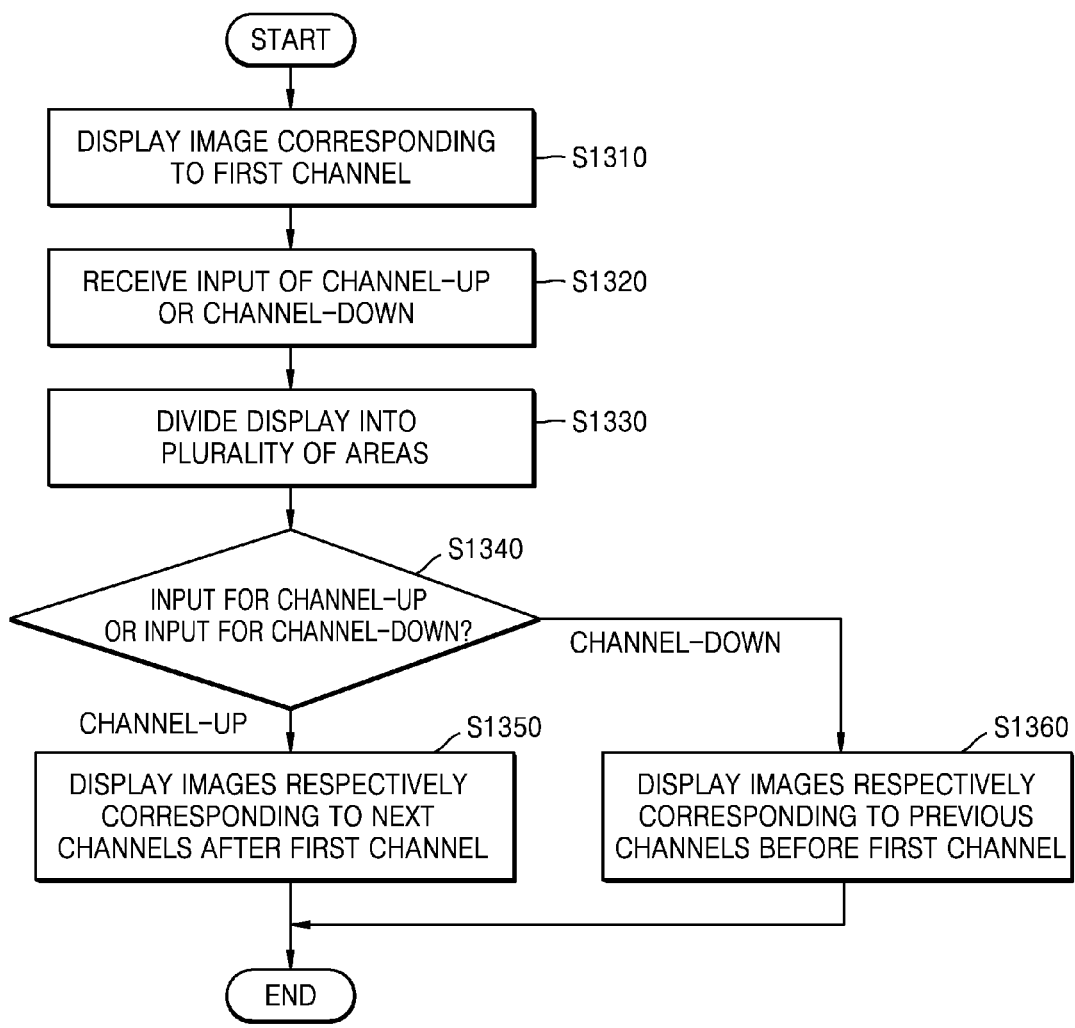
FIG. 20 is a flowchart of a method of displaying an image according to an exemplary embodiment.

FIG. 20 is a flowchart of a method of displaying an image according to an exemplary embodiment.

Referring to FIG. 20, the image display apparatus 100 displays an image, that is, a first channel image, corresponding to a first channel in the display 120 (S1310). The first channel may be a preset channel or a channel selected by a user.

The image display apparatus 100 receives a first input of channel-up or a second input of channel-down (S1320).

For example, the first input of channel-up may be an input of pressing the first direction key 253 indicating an upward direction of the two-direction key included in the control apparatus 200. Also, the second input of channel-down may be an input of pressing the second direction key 255 indicating a downward direction of the two-direction key included in the control apparatus 200. However, the present exemplary embodiment is not limited thereto.

The image display apparatus 100 divides the display 120 into a plurality of areas (S1330).

For example, the image display apparatus 100 may divide the display 120 into two, three, four, or eight areas, based on a preset layout.

The image display apparatus 100 determines whether the first input for channel-up or the second input for channel-down is received (S1340).

When the image display apparatus 100 determines that the first input for channel-up is received, the image display apparatus 100 displays images respectively corresponding to next channels after the first channel, in the areas (S1350).

For example, the image display apparatus 100 may display images respectively corresponding to channels having numbers greater than a channel number of the first channel, in the areas.

In contrast, when the image display apparatus 100 determines that the second input for channel-down is received, the image display apparatus 100 displays images respectively corresponding to previous channels before the first channel, in the areas (S1360).

For example, the image display apparatus 100 may display images respectively corresponding to channels having numbers less than the channel number of the first channel, in the areas.

FIG. 21 is a flowchart of a method of displaying an image according to an exemplary embodiment.

Referring to FIG. 21, the image display apparatus 100 divides the display 120 into a plurality of areas including a first area and a second area, displays an image corresponding to a first channel among channels included in a first channel group, in the first area, and displays an image corresponding to a second channel among channels included in a second channel group, in the second area (S1410).

For example, each of the first channel group and the second channel group may include at least one among a group including general channels, a group including favorite channels, and a group including channels classified by genre. Also, an order of channels included in the first channel group may be determined based on a channel number indicating each of the channels included in the first channel group. Also, an order of channels included in the second channel group may be determined based on a channel number indicating each of the channels included in the second channel group.

The image display apparatus 100 receives a first input of channel-up or a second input of channel-down (S1420).

The image display apparatus 100 determines whether the first input for channel-up or the second input for channel-down is received (S1430).

When the image display apparatus 100 determines that the first input for channel-up is received, the image display apparatus 100 displays an image corresponding to a third channel that is a next channel after the first channel among the channels included in the first channel group, in the first area, and displays an image corresponding to a fourth channel that is a next channel after the second channel among the channels included in the second channel group, in the second area (S1440).

In contrast, when the image display apparatus 100 determines that the second input for channel-down is received, the image display apparatus 100 displays an image corresponding to a fifth channel that is a previous channel before the first channel among the channels included in the first channel group, in the first area, and displays an image corresponding to a sixth channel that is a previous channel before the second channel among the channels included in the second channel group, in the second area (S1450).

When a zapping operation for channel search is performed, images corresponding to a plurality of channels may be simultaneously displayed, and thus a desired channel may be easily and quickly found.

Also, because images corresponding to channels included in each channel group may be simultaneously displayed, a user may easily and quickly find a desired channel.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of displaying an image, the method comprising:
   displaying a first image corresponding to a first channel, in a first area of a display, along with a second image corresponding to a second channel, in a second area of the display, along with a third image corresponding to a third channel, in a third area of the display, and along with a fourth image corresponding to a fourth channel, in a fourth area of the display;
   receiving a first input to select the first image, while the first image, the second image, the third image and the fourth image are displayed; and
   in response to receiving a second input to change a current channel to a next channel after the current channel, while the first image, the second image, the third image and the fourth image are displayed and the first image is selected:
      maintaining, in the first area, the first channel corresponding to the first image that is selected so that the first image remains selected;
      changing, in the second area, the second channel corresponding to the second image, to a fifth channel after a highest channel among the first channel, the second channel, the third channel and the fourth channel;
      changing, in the third area, the third channel corresponding to the third image, to a sixth channel after the fifth channel; and
      changing, in the fourth area, the fourth channel corresponding to the fourth image, to a seventh channel after the sixth channel.

2. The method of claim 1, further comprising:
   dividing the display into the first area and the second area, in response to a user input corresponding to a press of a first key corresponding to the second input or of a second key corresponding to a third input to change the current channel to a previous channel before the current channel, for more than a predetermined time duration.

3. The method of claim 1, wherein the changing the second channel comprises:
in response to the second input being received while the first image and the second image are displayed and the first image is selected, displaying, in the second area, a next image corresponding to the next channel that is determined among a plurality of channels included in a channel group in which the second channel is included.

4. The method of claim 3, wherein the channel group comprises any one or any combination of general channels, favorite channels, and genre channels that are classified by genre.

5. The method of claim 3, wherein the channel group is set by a user input.

6. The method of claim 1, wherein an order of a plurality of channels is determined based on a channel number indicating each of the plurality of channels.

7. The method of claim 1, wherein a next channel after a last channel among a plurality of channels is a first channel among the plurality of channels.

8. A method of displaying an image, the method comprising:
dividing a display into areas comprising a first area and a second area;
displaying, in the first area, an image of a first channel among first channels included in a first channel group;
displaying, in the second area, an image of a second channel among second channels included in a second channel group;
in response to receiving a first input to change the first channel and the second channel to next channels after the first channel and the second channel, respectively, while the image of the first channel and the image of the second channel are displayed, replacing, in the first area, the displayed image of the first channel with an image of a first next channel after the first channel, among the first channels included in the first channel group, and replacing, in the second area, the displayed image of the second channel with an image of a second next channel after the second channel, among the second channels included in the second channel group;
in response to receiving a second input to change the first channel and the second channel to previous channels before the first channel and the second channel, respectively, while the image of the first channel and the image of the second channel are displayed, replacing, in the first area, the displayed image of the first channel with an image of a first previous channel before the first channel, among the first channels included in the first channel group, and replacing, in the second area, the displayed image of the second channel with an image of a second previous channel before the second channel, among the second channels included in the second channel group; and
in response to receiving a third input corresponding to a press of a key corresponding to the first input, for more than a predetermined time duration, while the image of the first channel and the image of the second channel are displayed:
changing the display from the areas comprising the first area and the second area to additional areas comprising a third area, a fourth area, a fifth area, and a sixth area;
displaying the image of the first next channel, an image of a third next channel after the first next channel, and an image of a fourth next channel after the third next channel, among the first channels included in the first channel group, in the third area, the fourth area, and the fifth area, respectively; and
displaying, in the sixth area, the image of the second next channel among the second channels included in the second channel group.

9. The method of claim 8, wherein each of the first channel group and the second channel group comprises at least one among a group comprising general channels, a group comprising favorite channels, and a group comprising genre channels that are classified by genre.

10. The method of claim 8, wherein an order of the first channels included in the first channel group is determined based on a channel number indicating each of the first channels included in the first channel group.

11. The method of claim 8, wherein a next channel after a last channel among the first channels included in the first channel group is a first channel among the first channels included in the first channel group.

12. An image display apparatus comprising:
a display;
an interface; and
a controller configured to:
control the display to display a first image corresponding to a first channel, in a first area of the display, along with a second image corresponding to a second channel, in a second area of the display, along with a third image corresponding to a third channel, in a third area of the display, and along with a fourth image corresponding to a fourth channel, in a fourth area of the display;
receive, via the interface, a first input to select the first image, while the first image, the second image, the third image and the fourth image are displayed; and
in response to receiving, via the interface, a second input to change a current channel to a next channel after the current channel, while the first image, the second image, the third image and the fourth image are displayed and the first image is selected, control the display to:
maintain, in the first area, the first channel corresponding to the first image that is selected so that the first image remains selected;
change, in the second area, the second channel corresponding to the second image, to a fifth channel after a highest channel among the first channel, the second channel, the third channel and the fourth channel;
change, in the third area, the third channel corresponding to the third image, to a sixth channel after the fifth channel; and
change, in the fourth area, the fourth channel corresponding to the fourth image, to a seventh channel after the sixth channel.

13. The apparatus of claim 12, wherein the controller is further configured to:
divide the display into the first area and the second area, in response to a user input corresponding to a press of a first key corresponding to the second input or of a second key corresponding to a third input to change the current channel to a previous channel before the current channel, for more than a predetermined time duration.

14. The apparatus of claim 12, wherein the controller is further configured to control the display to:
in response to the second input being received while the first image and the second image are displayed and the first image is selected, display, in the second area, a next image corresponding to the next channel that is determined among plurality of channels included in a channel group in which the second channel is included.

15. The apparatus of claim 14, wherein the channel group comprises any one or any combination of general channels, favorite channels, and genre channels that are classified by genre.

16. The apparatus of claim 14, wherein the channel group is set by a user input.

17. The apparatus of claim 12, wherein an order of a plurality of channels is determined based on a channel number indicating each of the plurality of channels.

18. The apparatus of claim 12, wherein a next channel after a last channel among a plurality of channels is a first channel among the plurality of channels.

19. An image display apparatus comprising:
a display;
a controller configured to:
   divide the display into areas comprising a first area and a second area;
   control the display to display, in the first area, an image of a first channel among first channels included in a first channel group;
   control the display to display, in the second area, an image of a second channel among second channels included in a second channel group; and
an interface configured to receive a first input to change the first channel and the second channel to next channels after the first channel and the second channel, respectively, a second input to change the first channel and the second channel to previous channels before the first channel and the second channel, respectively, and a third input corresponding to a press of a key corresponding to the first input, for more than a predetermined time duration,
wherein the controller is further configured to control the display to:
   in response to the first input being received while the image of the first channel and the image of the second channel are displayed, replace, in the first area, the displayed image of the first channel with an image of a first next channel after the first channel among the first channels included in the first channel group, and replace, in the second area, the displayed image of the second channel with an image of a second next channel after the second channel among the second channels included in the second channel group;
   in response to the second input being received while the image of the first channel and the image of the second channel are displayed, replace, in the first area, the displayed image of the first channel with an image of a first previous channel before the first channel among the first channels included in the first channel group, and replace, in the second area, the displayed image of the second channel with an image of a second previous channel before the second channel among the second channels included in the second channel group; and
   in response to the third input being received while the image of the first channel and the image of the second channel are displayed:
      change the display from the areas comprising the first area and the second area to additional areas comprising a third area, a fourth area, a fifth area, and a sixth area;
      display the image of the first next channel, an image of a third next channel after the first next channel, and an image of a fourth next channel after the third next channel, among the first channels included in the first channel group, in the third area, the fourth area, and the fifth area, respectively; and
      display, in the sixth area, the image of the second next channel among the second channels included in the second channel group.

20. The apparatus of claim 19, wherein each of the first channel group and the second channel group comprises at least one among a group comprising general channels, a group comprising favorite channels, and a group comprising genre channels that are classified by genre.

21. The apparatus of claim 19, wherein an order of the first channels included in the first channel group is determined based on a channel number indicating each of the first channels included in the first channel group.

22. The apparatus of claim 19, wherein a next channel after a last channel among the first channels included in the first channel group is a first channel among the first channels included in the first channel group.

* * * * *